United States Patent [19]

Zupancic et al.

[11] Patent Number: 4,747,953

[45] Date of Patent: * May 31, 1988

[54] COMPOSITE MEMBRANES BASED ON INTERPENETRATING POLYMER NETWORKS

[75] Inventors: Joseph J. Zupancic, Bensenville; Raymond J. Swedo, Mt. Prospect, both of Ill.

[73] Assignee: Allied Corporation, Morristown, N.J.

[*] Notice: The portion of the term of this patent subsequent to Sep. 23, 2003 has been disclaimed.

[21] Appl. No.: 831,672

[22] Filed: Feb. 21, 1986

[51] Int. Cl.$^4$ ............................................. B01D 13/00
[52] U.S. Cl. ..................... 210/651; 210/490; 210/500.27; 210/500.28
[58] Field of Search ............ 210/500.28, 500.42, 210/490, 491, 654, 651, 506, 500.27, 500.33; 55/158; 427/244, 245, 246

[56] References Cited

U.S. PATENT DOCUMENTS

| | | | |
|---|---|---|---|
| 3,526,588 | 9/1970 | Michaels et al. | 210/23 |
| 3,549,569 | 12/1970 | Farah et al. | 260/18 |
| 3,661,634 | 5/1972 | Riley et al. | 117/161 |
| 3,767,737 | 10/1973 | Lundstrom | 264/41 |
| 3,892,665 | 7/1975 | Steigelmann et al. | 210/490 |
| 3,929,949 | 12/1975 | Day et al. | 264/46.4 |
| 3,951,789 | 4/1976 | Lee et al. | 210/22 |
| 4,005,012 | 1/1977 | Wrasidlo | 210/23 |
| 4,132,824 | 1/1979 | Kimura et al. | 428/220 |
| 4,220,535 | 9/1980 | Leonard | 210/321 |
| 4,243,701 | 1/1981 | Riley et al. | 427/244 |
| 4,262,041 | 4/1981 | Eguchi et al. | 427/245 |
| 4,272,378 | 6/1981 | Sano et al. | 210/500 |
| 4,377,481 | 3/1983 | Takabhazy | 210/500.42 X |
| 4,613,440 | 9/1986 | Zupancic et al. | 210/500.33 X |

*Primary Examiner*—Frank Spear
*Attorney, Agent, or Firm*—Thomas K. McBride; John F. Spears, Jr.; Raymond H. Nelson

[57] ABSTRACT

Semipermeable composite membranes which comprise an interpenetrating polymer network of the isocyanate-capped polymer which is the reaction product of a polyether and an isocyanate with a copolymer containing at least two saturated or unsaturated heterocyclic nitrogen-containing compounds composited on a porous backing support material may be used in various separation systems. These separation systems may include reverse osmosis, ultrafiltration, gas separation, dialysis, etc., an especially useful system being the separation of sugars.

27 Claims, No Drawings

COMPOSITE MEMBRANES BASED ON INTERPENETRATING POLYMER NETWORKS

BACKGROUND OF THE INVENTION

The use of semipermeable membranes for the separation of gases or liquids in reverse osmosis or ultrafiltration processes is well known. For example, in a reverse osmosis process, high pressure saline water may be placed in contact with a semipermeable membrane which is permeable to water but relatively impermeable to salt. Concentrated brine and relatively pure water are separated thereby; the relatively pure water may then be utilized for personal use such as drinking, cooking, etc., while the brine may be discarded. In addition, membranes may also be utilized for the separation of various gases. The separation of a gas mixture utilizing a membrane is effected by passing a feedstream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

This ability to separate gases from a mixture stream will find many applications in commercial uses. For example, gas separation systems may be used for oxygen enrichment of air, for improved combustion efficiencies and conservation of energy resources. Likewise, nitrogen enrichment of air may be applicable where inert atmospheres are required. Other applications for oxygen enriched gases may be improving selectivity and efficiency of chemical and metallurgical processes. Similarly, inert atmospheres such as may be provided for by this invention may also be utilized in chemical and metallurgical processes. Some other applications of gas separation would include helium recovery from natural gas, hydrogen enrichment in industrial process applications, and scrubbing of acid gases. Specific uses for oxygen enrichment of air would be breathing systems for submarines and other underwater stations, improved heart-lung machines, and other lung assist devices. Another specific application of a gas separation system would be an aircraft to provide oxygen enrichment for life-support systems and nitrogen enrichment for providing an inert atmosphere for fuel systems. In addition, gas seperation systems may be used for environmental benefits, e.g., methane can be separated from carbon dioxide in waste gases for sewage treatment processes and oxygen enriched air can be produced to enhance sewage digestion.

Another use for which membranes may be employed is the separation of polysaccharides into useable constituents. For example, in many commercial enterprises sugar is utilized to a great extent for its sweetening properties. It is used in the sweetening of foods, for the manufacture of syrups and confectionery items, in preserves and jams, as a chemical intermediate for detergents, emulsifying agents and other sucrose derivatives such as plasticizers, resins, glues, etc. The usual derivation of sugar is from cane sugar and sugar beets. It is obtained by crushing and extracting the sugar from the cane with water or extracting the sugar from the sugar beet with water followed by evaporation and purifying with lime, absorbent carbon and/or various liquids. The chief component of this type of sugar is sucrose, while other sugars may contain other polysaccharides such as dextrose and levulose (fructose). Other polysaccharides which possess sweetening properties include glucose, maltose, etc. The various polysaccharides possess varying degrees of sweetness, especially when in pure form and not contaminated by any reversion products.

One source of glucose which possesses a relatively high degree of sweetness and which, in turn, may be converted to fructose, the latter possessing an even greater degree of sweetness, is a starch. As is well known, starch is present in many naturally-occurring plants including corn, potatoes, rice, tapioca, wheat, etc. Heretofore, it has been known to treat starch with an enzyme such as amyloglucosidase to obtain glucose. However, the treatment heretofore provided entailed a relatively long residence time in order to obtain a glucose syrup which contained about 94% glucose. The relatively long residence time which has heretofore been required restricts the throughput of glucose and results in the appearance of reversion products which impart a bitter taste to the glucose, thus negating the sweetening property of the compound as well as requiring further treatment in order to remove the offending product. One such reversion product which imparts a bitter taste comprises isomaltose.

Many methods involving the use of an enzyme such as amyloglucosidase to convert starch into sugar have been tried. However, each of these methods has some disadvantages attached hereto. For example, when using a free enzyme, it is necessary to continuously replace the enzyme which is lost during the production of the desired saccharide. Likewise, when using an immobilized enzyme, the heretofore relatively long residence time has resulted in the appearance of unwanted side products.

One method of overcoming many of the disadvantages hereinbefore set forth is to contact the feedstock such as starch with an enzyme for a relatively short residence time and thereafter subjecting the partially hydrolyzed reaction mixture which is obtained from the conversion reaction to an ultrafiltration step wherein said reaction mixture is passed over a membrane whereby higher glucose syrup will pass through the membrane as a permeate while the retentate material containing unhydrolyzed oligosaccharides may be recycled for additional treatment.

As will hereinafter be shown in greater detail, by utilizing the membranes of the present invention, it is possible to obtain a high degree of saccharide separation, which results in the obtention of desired products at a relatively low operating cost.

Heretofore, membranes which may be used for reverse osmosis or ultrafiltration processes have been prepared using a wide variety of chemical compounds to obtain the desired membrane. For example, U.S. Pat. No. 3,892,655 discloses a membrane and a method for producing the membrane in which a thin polymer film is formed on the surface of a liquid, generally water, and is subsequently transferred to the surface of a porous supporting membrane. During the transfer of thin polymer film, the porous support is maintained in a wetted stage with the liquid. Another U.S. patent, namely U.S. Pat. No. 3,526,588 discloses a macromolecular fractionation process and describes a porous ultrafiltration membrane which is selective on the basis of pore size. Likewise, U.S. Pat. No. 3,767,737 discloses a method for producing the casting of "ultra-thin" polymer membranes similar in nature to previously mentioned U.S. Pat. No. 3,892,655 in that the thin film of the membrane is formed on the surface of a liquid and transferred to the surface of a porous support membrane. However, the thin film polymer will thus inherently possess the same disadvantage which may be ascribed to the membrane formed by the latter patent in that the thin film of the finished membrane is weakly attached to the porous support and the membrane thus produced cannot withstand substantial back pressure when in operation.

As was previously mentioned, semipermeable membranes have been prepared from a variety of compounds by utilizing a polymer as the membrane-forming material. Examples of semipermeable membrane-forming polymers which have been used will include silicon-containing compounds such as dimethyl silicon, silicon-carbonate copolymers, fluorinated silicons, etc., polystyrene-polycarbonate, polyurethanes, styrene-butadiene copolymers, polyarylethers, epoxides, cellulose nitrate, ethyl cellulose, cellulose acetate mixed with cellulose esters, etc. The membrane resulting from the polymer is usually composited on a finely porous support membrane such as polysulfone, cellulose nitrate-cellulose acetate, etc., the composition being, if so desired, impregnated on a natural fabric such as canvas, cotton, linen, etc. or on a synthetic fabric such as Dacron, Nylon, Orlon, etc.

Examples of some semipermeable membranes which have been used in the past are those described in U.S. Pat. No. 4,005,012 which discloses a thin-film composite membrane comprising a cross-linked epiamine composited on a porous support such as polysulfone, the composition being impregnated on a backing material such as Dacron. U.S. Pat. No. 4,132,824 discloses an ultra-thin film of a polymer composite comprising a blend of a methylpentene polymer and an organopolysiloxane-polycarbonate interpolymer while U.S. Pat. No. 4,243,701 discloses a membrane comprising a dimethyl silicon composited on a cellulose nitrate-cellulose acetate support member.

In addition to the aforementioned patents, other U.S. patents also disclose membrane materials. For example. U.S Pat. No. 4,262,041 discloses a process for preparing a composite amphoteric ion-exchange membrane in which monomers having a primary to a quaternary ammonium radical such as vinylpyridine and monomeric units possessing alcohol or acid functions are cross-linked with a compound such as a diisocyanate by reaction of the isocyanate with the alcohol or acid group to obtain a cross-linked polymer. The use of compounds such as vinylpyridine in this patent is as a component of a copolymer, the other monomer component of said copolymer being a compound which is capable of receiving a cation exchange group to prepare the desired amphoteric copolymer. It is the intent of this patent to cross-link these copolymers in order to render them insoluble in the media in which they are to be used. As will hereinafter be shown in greater detail, the isocyanates which are present in our invention are not used for the same purpose as taught by this patent. In a similar manner, the copolymer of at least two saturated or unsaturated heterocyclic nitrogen-containing compounds which is used in our invention is not employed as one component of a chargebearing, cross-linked copolymer, as taught by this patent.

U.S. Pat. No. 3,661,634 describes the use of an Interpenetrating Polymer Network membrane for reverse osmosis. The membrane is prepared from poly(vinylpyrrolidinone) as the host polymer and polyisocyanates as the guest polymer component with these latter prepolymers being chosen from those materials used in urethane coating and foam applications. The membrane is generated by casting a solution of the host and guest polymer and then curing said membrane via a two-stage process. The result is a membrane which exhibits increased salt rejection with increasing isocyanate equivalent ratio.

U.S. Pat. No. 4,272,378 is drawn to a semipermeable membrane involving the use of polymers containing more than 40 mole percent of acrylonitrile, said acrylonitrile being copolymerized with other monomers. The result is a membrane which will possess characteristics and performances which are entirely different and apart from those which are possessed by the membranes of the present invention. U.S. Pat. No. 4,220,535 claims a multi-zoned hollow fiber permeator which may be obtained from any suitable synthetic or natural material suitable for fluid separation or as supports for materials which effect fluid separations. However, this patent does not disclose the interpenetrating polymer network which makes up the membrane of the present invention.

U.S. Pat. No. 3,951,789, discloses high diffusivity membranes which consist of physically admixed matrix materials with solutions of polyamide amines, said admixed solution being cast into membranes. In this patent, the matrix materials such as poly(phenyl ether) are intimately admixed with the polymers, this admixture being unlike and distinct from the membranes of the present invention which are hereinafter set forth in greater detail.

Another U.S. Pat. No. 3,549,569 discloses the use of one-component polyurethane coatings or moisture cured coatings. In this patent, the coatings are based on the use of moisture curing 1-isocyanate-3-isocyanatomethyl--3,5,5-trimethylcyclohexane capped polyether (polyols) having a molecular weight of at least 500. The resulting coatings are flexible, impact resistant and mar resistant.

From a reading of the following specification and dependent claims, it will be apparent that we have now discovered novel membranes, which comprise an interpenetrating polymer network of an isocyanate-capped polymer and a copolymer of at least two saturated or unsaturated heterocyclic nitrogen-containing compounds which are composited on a porous backing support material, may be prepared to form membranes which will possess desirable characteristics when being utilized in separation processes.

SUMMARY OF THE INVENTION

This invention relates to novel composite membranes and to a method for the preparation thereof. More specifically, the invention is directed to novel composite membranes which may be utilized in the separation of liquids or gases when employed in various separation processes such as reverse osmosis, ultrafiltration, gas separation, dialysis, etc. By employing the membranes of the present invention, it is possible to effect the separation process in an efficient manner due to the characteristics of the membranes which include controlled swelling, selectivity, and flux.

The novel composite membrane of the present invention will be based on an interpenetrating polymer network. This membrane is, as its name suggests, a system comprised of more than one polymer. The multiple polymers which comprise the system are based in such a manner so that the polymer chains of the two components intermix or interpenetrate with one another to result in a system which generates a new polymer network. The two or more polymers which are involved in this interpenetrating polymer system do not react with one another, in contrast to various polymer membranes which are found in prior references, and thus form a chemical bond between themselves, but remain distinct entities. The polymers which comprise the system cannot be extracted from one another and will show no phase separation. The interpenetrating polymer network membrane which results form the process hereinafter set forth in greater detail will possess unique properties which are independent of the properties exhibited by the host polymer and the guest polymer and will not comprise an averaging of these properties.

It is therefore an object of this invention to provide semipermeable composite membranes which are utilized in a variety of separation processes.

A further object of this invention is found in a semipermeable interpenetrating polymer network membrane and to a process for preparing the membrane whereby the resultant product (the interpenetrating polymer network) will comprise a unique membrane.

In one aspect an embodiment of this invention resides in a composite membrane which comprises an interpenetrating polymer network of the reaction product (polyurethane) generated from an isocyanate-capped polyether or polymer, said reaction product being physically entwined with a copolymer of at least two saturated or unsaturated heterocyclic nitrogen-containing compounds, said composite membrane being supported on a porous support backing material.

Another embodiment of this invention is found in a process for the production of a composite interpenetrating polymer network membrane which comprises reacting a polyether with an diisocyanate to form an isocyanate-capped polymer, admixing said isocyanate-capped polymer with a copolymer of at least two saturated or unsaturated heterocyclic nitrogen-containing compounds to form an interpenetrating polymer network membrane, casting said membrane on a porous support backing material, curing the resultant composite in a hydrous atmosphere, and recovering the resultant composite interpenetrating network membrane.

Yet another embodiment of this invention is found in a process for the separation of a saccharide from a mixture of mono- and polysaccharides which comprises passing said mixture through a composite membrane comprising an interpenetrating polymer network of: (1) a polyurethane generated from an isocyanate-capped polymer which is obtained by reacting a polyether with an isocyanate, said reaction product being physically entwined with (2) a copolymer of at least two saturated or unsaturated heterocyclic nitrogen-containing compounds, said composite membrane being supported on a porous support backing material at separation conditions to form a retentate and a permeate, and recovering said permeate consisting mainly of a monosaccharide.

Yet another embodiment of this invention will be found in a process in which said polyurethane of the interpenetrating polymer network membrane is the reaction product obtained from an isocyanate-capped polypropylene glycol, said copolymer of at least two saturated or unsaturated heterocyclic nitrogen-containing compounds is poly[N-vinylimidazole-N-vinylpiperidine] and said porous support backing material is polysulfone.

A specific embodiment of this invention is found in a composite membrane which comprises an interpenetrating polymer network of the reaction product comprising a polyurethane generated from a toluene diisocyanate capped block copolymer of ethylene glycol and propylene glycol, said polyurethane being physically entwined with a copolymer comprising poly[N-vinyl-pyridine-N-vinylpyrrolidinone].

Another specific embodiment of this invention will be found in a process for the production of a composite membrane in which said polyurethane of the interpenetrating polymer network membrane is the reaction product obtained from an isocyanate-capped polypropylene glycol and poly[methylene poly(phenylisocyanate)], said copolymer of at least two saturated or unsaturated heterocyclic nitrogen-containing compounds is poly[N-vinylimidazole-N-vinylpyrrolidinone] and said porous support backing material is polysulfone.

Yet another specific embodiment of this invention will be found in a process for the production of a composite membrane in which said polyurethane of the interpenetrating polymer network membrane is the reaction product obtained from an isocyanate-capped polyethylene glycol and poly[methylene poly(phenylisocyanate)], said copolymer of at least two saturated or unsaturated heterocyclic nitrogen-containing compounds is poly[N-vinylimidazole-N-vinylpyrrolidinone] and said porous support backing material is polysulfone.

Still another specific embodiment of this invention is found in a process for the production of a composite membrane which comprises reacting a block copolymer of ethylene glycol and propylene glycol with toluene diisocyanate at a temperature in the range of from about 50° to about 100° C., thereafter admixing the resultant isocyanate-capped polymer reaction product with a copolymer comprising poly[N-vinylimidazole-N-vinyl-pyrrolidinone] at ambient temperature and pressure, casting the admixture on a polysulfone backing support material, curing the composite in a hydrous atmosphere at a temperature in the range of from about ambient to about 100° C. in an atmosphere which possesses a relative humidity in the range of from about 20% to about 100%, and recovering the resultant membrane.

Other objects and embodiments will be found in the following detailed description of the invention

DETAILED DESCRIPTION OF THE INVENTION

As hereinbefore set forth, the present invention is concerned with novel composite membranes based upon interpenetrating polymer networks, and a method for the preparation thereof. The membranes which may be used in a wide variety of separation processes comprising a semipermeable composite consisting of an interpenetrating polymer network or polymer blend, the two terms being used synonymously and interchangeably here in the specification and appended claims, generated from an isocyanate-capped polymer and a copolymer of at least two saturated or unsaturated nitrogen-containing compounds in which the polymer blend is composited on a porous backing support material. The interpenetrating polymer network which comprises the membrane of the present invention is composed of two or more polymers, or copolymers. A feature which distinguishes interpenetrating networks from a similar polymer blend is the fact that at least one of the polymer components of the interpenetrating networks is cross-linked to itself or to like components, but not to the other polymers. This unique cross-linking which is inherent to an interpenetrating network system means that the polymers which comprise the components of the system are physically entangled or entwined, but are not bound to one another by chemical bonds.

The isocyanate-capped prepolymers are prepared by reacting a polyether with a diisocyanate. The isocyanate-capped prepolymer upon reaction with water results in the partial hydrolysis of the isocyanate radicals to yield substituted amine radicals. The amine radicals react further with the remaining isocyanate radicals to generate a urethane linkage, with this resulting polymer being known as a polyurethane. The reactions are graphically illustrated in the following flow scheme.

cross-linked polyurethane network which physically and permanently entwines or entangles the copolymer of at least two saturated or unsaturated heterocyclic nitrogen-containing compounds in the network. However, the copolymer of at least two saturated or unsaturated heterocyclic nitrogen-containing compounds which, in this system, comprises the host polymer is not chemically bonded or cross-linked either to itself or to the polyurethane polymer resulting from the reaction of amine-capped polymer with isocyanate-capped polymer. Inasmuch as the copolymer of at least two saturated or unsaturated heterocyclic nitrogen-containing compounds is so entwined or entangled in the cross-linked polyurethane polymer, it is no longer soluble and cannot be dissolved out of the interpenetrating network matrix. The isocyanate-capped polymer which comprises one component of the copolymer may be prepared by reacting a polyether such as polyethylene

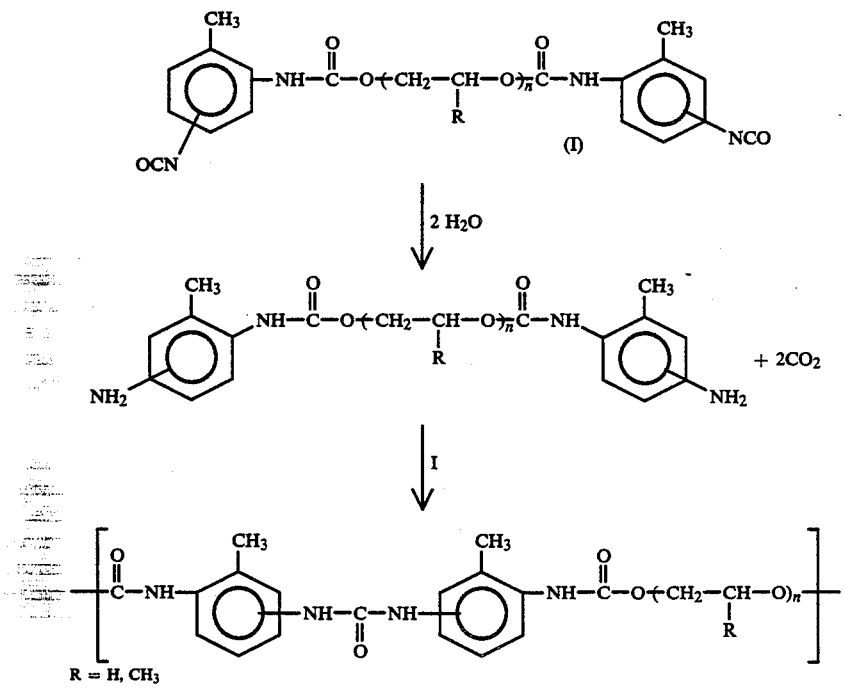

When preparing an interpenetrating network membrane, the two polymers, which may be designated as a host polymer and a guest polymer, are dissolved in a mutually compatible solvent, during which time the chains of polymers become entwined. The solution containing the entwined polymers is cast upon a porous backing support material which may itself comprise a polymer, and as the solvent is allowed to evaporate, the chains of the component polymers remain physically entwined. Inasmuch as this is only a physical interaction, it differs from prior polymeric membranes in that no chemical cross-linking or covalent bonding has taken place between the different types of polymer chains. After casting and evaporation of the solvent, the coated support is then subjected to a cross-linking curing action which occurs in a high humidity or hydrous atmosphere. When exposed to this type of atmosphere, a portion of the isocyanate-capped polymer which, in this system, comprises the guest polymer hydrolyzes to form an amine-capped polymer. This portion of amine-capped polymer will react with the remaining portion of the original isocyanate-capped polymer to form a glycol, polypropylene glycol or block copolymers containing both ethylene glycol and propylene glycol with an diisocyanate-containing compound.

This same interpenetrating polymer network can be generated by two alternate routes. The first would involve the generation of the cross-linked polyurethane polymer in the absence of the copolymer based on two saturated or unsaturated heterocyclic nitrogen-containing components. Then the heterocyclic nitrogen-containing copolymer would be introduced into the polyurethane network (in this case called the host polymer) and polymerized by known methods generating the guest polymer. Alternatively, the interpenetrating polymer network could be generated by the simultaneous or sequential polymerization of both the host and guest polymer by introducing into the casting solution the monomeric unsaturated or saturated heterocyclic nitrogen-containing monomers and the isocyanate-capped polyether. The units comprising the host and guest polymers can be polymerized simultaneously or sequentially to generate the final interpenetrating polymer network which would be comprised of the copolymer containing the saturated or unsaturated heterocyclic components and the polyurethane. However, as described earlier this system, the interpenetrating polymer network, can not be generated by the blending together of the preformed copolymer containing saturated or unsaturated heterocyclic components and polyurethane.

The isocyanate-containing compound may comprise compounds such as toluene diisocyanate, methylenediphenylisocyanate, ethylene diphenylisocyanate, propylene diphenylisocyanate, etc. It is to be understood that the aforementioned polyethers and diisocyanate compounds are only representative of the types of compounds which may be employed and that others may also be used in the present invention, although not necessarily with equivalent results.

The polyether component of the isocyanate-capped polymer can be polyethylene glycol, polypropylene glycol, block copolymers containing both ethylene glycol and propylene glycol. These polyethers should be chosen from those having an average molecular weight in the range of from about 100 to about 450. This molecular weight range for a one-component polyurethane coating or moisture cured coating is below that taught in the art, as shown in previous works such as H. L. Heirs, et al., Ind. Eng. Chem., 46, 1498 (1954); U.S. Pat. Nos. 3,549,569; 3,661,634; and J. A. Brydson, "Plastic Materials", 4th Edition, 1982, Butterworth Scientific, pp. 716 and 718, which describe polyethers having an average molecular weight in excess of 500 and up to about 3,000.

The reaction of the polyether or block copolymer with the isocyanate-containing compound is usually effected at reaction conditions which include an elevated temperature in the range of from about 50° to about 100° C. and preferably at atmospheric pressure, although it is contemplated within the scope of this invention that, if so desired, superatmospheric pressures ranging from 2 to about 50 atmospheres may be employed. The average molecular weight of the isocyanate-capped polymer can be varied by utilizing varying molecular weight polyethers, block copolymers or capping agents. For example, one particular polyether which may be employed comprises polypropylene glycol having a molecular weight of 425. Alternatively, the polyether can be polyethylene glycol having a molecular weight of 400 or 300. However, it is to be understood that these are but a few examples of the polyethers which may be employed. In the preferred embodiment of the invention, the reaction is effected under neat conditions, although if so desired, solvents such as chloroform, carbon tetrachloride, or any other organic solvent in which the compounds are soluble may also be employed.

The choice of the polyether used in the isocyanate-capped polyether will significantly affect the properties of the final formed interpenetrating polymer network membrane. Two such parameters which must be considered in the choice of the polyether are chain length and functional substitution. For example, alkyl substitution, i.e. methyl in place of hydrogen, will result in increase of hydrophobicity for polyethers of equivalent chain length. Decreasing the polyether chain length will result in a membrane with better separation qualities, flux and selectivity.

A second component, in addition to the isocyanate-capped polymer, in the preparation of the guest polymer may be a polyisocyanate such as methylenediphenylisocyanate or poly[methylene poly(phenylisocyanate)]. The use of the polyisocyanates without the isocyanate-capped polyethers should be avoided since the resulting membranes will fail to possess the desired chemical and physical properties imparted to the membrane through the use of the isocyanate-capped polyethers.

The isocyanate-capped polymers which have been described above may then be dissolved in an appropriate solvent such as, for example, nitromethane and thereafter the copolymer of at least two saturated or unsaturated heterocyclic nitrogen-containing compounds may be added to the solvent. The copolymers which, as hereinbefore set forth, constitute the host polymer of the membrane will be prepared from at least two saturated or unsaturated heterocyclic nitrogen-containing compounds such as 2-vinylpyridine, 4-vinylpyridine, N-vinylpyrrolidinone, vinylquinoline, symmetrical vinyltriazines, unsymmetrical vinyltriazines vinylimidazole, N-vinylpiperidine, vinylpyrazine, vinylpyrimidine, N-vinyl-N'-alkylpiperazines in which the alkyl substituent may contain from 1 to about 6 carbon atoms, specific examples including N-vinyl-N'-methylpiperazine, N-vinyl-N'-ethylpiperazine, N-vinyl-N'-propylpiperazine, N-vinyl-N'-butylpiperazine, N-vinyl-N'-pentylpiperazine, N-vinyl-N'-hexylpiperazine, etc. Some examples of copolymers of the aforementioned heterocyclic nitrogen-containing compounds will include poly[4-vinylpyridine-N-vinylpyrrolidinone], poly[2-vinylpyridine-N-vinyl-pyrrolidinone], poly[N-vinylimidazole-N-vinylpyrrolidinone], poly[N-vinylimidazole-N-vinylpiperadine], poly[N-vinylimidazole-N-vinylquinoline], poly[N-vinylimidazole-2-vinylpyridine]poly[N-vinylimidazole-4-vinylpyridine], poly[N-vinylimidazole-N-vinylpyrimidine], poly[N-vinylimidazole-N-vinyl-N'-methylpiperazine], poly[N-vinylimidazole-N-vinyl-N'-ethylpiperazine], poly[N-vinylpyrazine-N-2-vinylpyridine], poly[N-vinylimidazole-N-vinyltriazine], poly[N-vinylquinoline-N-vinyltriazine], poly[N-vinylquinoline-N-vinylpyrrolidinone], poly-N-vinylpyrazine-N-vinylpyrrolidinone], poly[N-vinylpyrimidine-N-vinyltriazine], etc. It is to be understood that the aforementioned list of heterocyclic nitrogen-containing compounds and copolymers thereof are only representative of the class of compounds which may be employed to form the desired copolymer, and that the present invention is not necessarily limited thereto.

The formation of the membrane-forming composite is preferably effected at operating conditions which include ambient temperature and atmospheric pressure. After thoroughly admixing the isocyanate-capped polymer and the heterocyclic nitrogen-containing compound until a homogeneous solution is effected, the composite membrane is then prepared by contacting a porous support member with the solution. The porous backing support member or material may comprise a polymer such as polysulfone, polyethylene, polypropylene, polyphenylene oxide, cellulose nitrate, cellulose acetate, etc., the thickness of this porous support material being in a range of from about 0.01 to about 100.0 microns. It is also contemplated within the scope of this invention that, if so desired, the porous support member or material may be impregnated on a fabric which acts as a backing therefore, said backing member being either natural or synthetic in origin and either woven or nonwoven in configuration. Some specific examples of these backing members which may be employed will include natural fabrics such as polyesters, either woven or nonwoven, Dacron, Nylon, Orlon, etc. The support member which is contacted with the solution may be either in a wet or dry state.

In one embodiment, the composite membranes may be prepared by continuously forming a thin layer of the interpenetrating polymer network of the isocyanate-capped polymer and copolymer of at least two saturated or unsaturated heterocyclic nitrogen-containing components directly on the finely porous surface of the support material by continuously passing one surface of the support material through the casting solution which contains the polymer network components. The thickness of the film of the interpenetrating polymer network may be controlled by the concentration of the polymer network components in the solution as well as by the rate of withdrawal of the support material from the solution. By utilizing this method of asymmetric membrane preparation, it is possible to achieve several additional degrees of freedom beyond that which is possible when preparing a membrane according to more conventional methods. Some examples of these advantages will include an independent selection of materials constituting the finely porous support material, and independent preparation of the thin film and the porous support material whereby it is possible to optimize each component for its specific function, a reproductive variation in control over the thickness of the semipermeable barrier which is required to obtain the theoretical maximum in performance control over the porosity and perfection of the semipermeable barrier which is necessary to attain the theoretical semipermeability of the material, and the formation of the film directly on the finely porous surface of the support whereby said film is integrally bonded to the support member, thus permitting the finished membrane to withstand any back pressure which may be encountered in normal operation.

As an illustration of this continuous method of forming the film on the finely porous support material, a finely porous support may be prepared by casting the support on a casting machine from a solution which contains the support material such as a polysulfone, cellulose acetate, etc. as well as solvents such as ketones, including acetone, methylethylketone, diethylketone, etc., alcohols including methyl alcohol, ethyl alcohol, n-propyl alcohol, etc. and surfactants to increase the wettability of the components of the solution. The solution, after blending the various components thereof, is filtered to remove any foreign material by passing through a filter medium under superatmospheric pressure usually afforded by the presence of nitrogen, and thereafter is degassed to remove any dissolved inert gas, such as nitrogen. The solution is fed onto the casting belt and spread on said belt at a desired thickness by means for controlling the thickness such as a casting knife. The freshly cast solution is carried on the belt into a gelation chamber which is maintained at a slightly elevated temperature in the range of from about 10° to about 40° C. After passage through this first gelation chamber wherein the surface pores, size and permeability of the membrane are controlled, the belt and support membrane are passed into a second gelation chamber in which the properties of the membrane are fixed. The temperature of the second gelation chamber is higher than that of the first gelation chamber in order to promote the removal of the solvents which may be present. After passing from the second gelation chamber, the membrane is removed from the casting belt and passed to storage. Alternatively, after passing from the second gelation chamber, the support member may be contacted with the hereinafter described casting solution while in a wet state.

The support member or material which, if so desired, may be backed by a fabric of a type hereinbefore set forth is then continuously passed through a casting solution while in a wet state.

The support member or material which, if so desired, may be backed by a fabric of a type hereinbefore set forth is then continuously passed through a casting solution containing the interpenetrating polymer network of the isocyanate-capped polymer and a copolymer of at least two saturated or unsaturated heterocyclic nitrogencontaining components, said polymer network being dissolved in the appropriate solvent. The particular organic solvent which is employed will comprise the type of solvent which will dissolve the semipermeable membrane-forming polymer network, but will not be of the type which will dissolve or solubilize the porous support material or member, thus it is apparent that the particular solvent which is employed will depend upon both the interpenetrating polymer network and the particular support member which is to be employed.

The polymer blend of the isocyanate-capped polymer and the copolymer of at least two saturated or unsaturated heterocyclic nitrogen-containing components will be present in the casting solution in an amount in the range of from about 0.1% to about 5.0% by weight of said solution, the amount of polymer blend present in the solution being dependent upon the desired thickness of the semipermable membrane to be prepared. The solution is placed in a container or apparatus which is provided with a roller extending into the solution but is not completely immersed therein. The porous support member is continuously passed into the solution containing the polymer blend in such a manner so that the support member travels under the roller, one side of said support member being in contact with the roller. Inasmuch as one side of the support member is in contact with the roller, only the other side of the support member is in contact with the solution. The feed of the support member through the solution and rate of withdrawal may range from about 0.1 to about 50.0 ft./min., said rate again being dependent upon the thickness of the film which is desired to coat the support member.

After continuously withdrawing the polymer blend coated support material from the solution, the resulting composite membrane is cured by exposure to a hydrous atmosphere by passage through a curing zone. The curing in said zone is effected at a temperature in the range of from about ambient (20°-25° C.) up to about 100° C. while maintaining the atmosphere in the curing zone at a relative humidity which will range from about 20% to about 100%. The curing of the membrane will be effected for a period of time which will range from about five minutes to about 48 hours in duration, the time of curing being dependent upon the various parameters such as temperature and humidity. In any instance, the time will be sufficient to generate a substituted amine, thereby converting a portion of the isocyanate-capped polymer to an amine-capped polymer. As was hereinbefore set forth, the remaining portion of the isocyanate-capped polymer will react with the amine-capped polymer to form a cross-linked network, physically and permanently entwining the host polymer comprising the copolymer of at least two saturated or unsaturated heterocyclic nitrogen-containing compounds in said network.

One example of a separation process in which the membranes of the present invention may be employed comprises the separation of monosaccharides from a mixture of mono and polysaccharides. As was hereinbefore set forth, the obtention of a relatively pure glucose from a mixture of sugars is of particular importance. When such a separation is desired, a feedstock comprising a liquid starch which has been previously treated with an enzyme such as alpha amylase to increase the dextrose equivalent is contacted with an enzyme such as amyloglucosidase, either in immobilized or free-standing condition, for a predetermined period of time while employing reaction conditions which may include a temperature in the range of from about 45° to about 70° C. and a pressure which may range from about 25 to about 1500 psi. In addition, the residence time during which the feedstock is in contact with the enzyme is correlated with the Liquid Hourly Space Velocity at which the feed is introduced so as to produce a conversion of the liquid starch to glucose within a previously determined range. The conversion range, in the preferred embodiment, is that in which the feedstock is only partially hydrolyzed so as to insure a concomitant low or nonexistant production of unwanted reversion products such as isomaltose, which may impart a relatively bitter taste to the product, and thus alter or destroy the sweetness of the desired product.

The partially hydrolyzed reaction mixture is then passed through a membrane of the present invention whereby the mixture is separated into a retentate and a permeate. The permeate, which comprises the desired product of the separation will contain a relatively high percentage of DP1 product, namely, glucose, said percentage usually being in excess of 94%. The retentate material which contains unhydrolyzed oligosaccharides such as those which have a DP rating of DP7, DP8, DP9+ (the designation DP being the degree of polymerization) is also recovered and a portion thereof may be recycled back to the hydrous step for further contact with the enzyme whereby a further conversion to the desired glucose product may be effected. The separation conditions which are employed to produce the desired glucose from the mixture of saccharides will preferably include a temperature in the range of from about ambient to about 70° C. and a pressure in the range of from about 25 to about 1500 psi. As will hereinafter be shown in greater detail, by utilizing the membranes of the present invention which comprise an interpenetrating polymer network of the reaction product of an isocyanate-capped polymer which is obtained by reacting a polyether with a diisocyanate, said reaction product being physically entwined with a copolymer of at least two saturated or unsaturated heterocyclic nitrogencontaining compounds, it is possible to obtain glucose separations in excess of 94% with a concomitant high rate of flux.

The following examples are given for purposes of illustrating the novel composite membranes of the present invention, a method for the preparation thereof and their use in separation processes. However, it is to be understood that these examples are merely illustrative in nature and that the present process is not necessarily limited thereto.

EXAMPLE I

Poly[N-vinylimidazole-N-vinylpyrrolidinone] was prepared by charging 23.5 grams (0.250 moles) of N-vinylimidazole, 83.25 grams (0.750 moles) of N-vinylpyrrolidinone and 1.0 grams of AIBN to a one liter reaction vessel along with 450 ml of water. The reaction was stirred and heated to a temperature of 75° C. under a nitrogen atmosphere for a period of one hour. At the end of this time, the reaction mixture was allowed to cool to room temperature and after reaching room temperature, the copolymer was precipitated out of solution by adding the solution to 1,4-dioxane. The precipitated copolymer was dried for a period of 16 hours in a vacuum oven at 60° C. to yield 84.40 grams of copolymer.

Elemental analysis of the product disclosed 62.51% carbon, 8.05% hydrogen, 15.66% nitrogen and a carbon-to-nitrogen ratio of 3.99. In addition, the composition of the copolymer comprised 20.95% N-vinylimidazole and 79.05% N-vinylpyrrolidinone.

Preparation of TDI-capped polypropylene oxide (TDI-PPO) (PPO,MW=425,n=7.02): The isocyanate-capped polymer which comprised the second component of the membrane was prepared by charging 35.0 grams (0.201 moles) of toluene diisocyanate (80% 2,4-, 20% 2,6-) to a 500 ml reactor. The reaction mixture was heated to a temperature of 65° C. with stirring under a nitrogen atmosphere, and 47.0 grams (0.115 moles) of poly(propylene glycol) which had a molecular weight of 425 (n=7.02) was added to the stirred reactor over a period of 45 minutes. The reaction mixture was continuously stirred while maintaining the temperature of the reactor in a range of from 70° to about 75° C. for a period of three hours. At the end of this time heating was discontinued and after the reactor had returned to room temperature, the isocyanate-capped polymer in an amount of 70.6 grams (86.1%) was recovered.

EXAMPLE II

The composite membrane of the present invention was prepared by casting the two components of the thin film membrane of Example I onto a solid porous backing material utilizing two different solvent systems. In one system, the two components were dissolved in nitromethane and cast from this solution onto a polysulfone support having varying pore diameters. One polysulfone support had pore diameters of around 95 Angstroms and the other had pore diameters ranging from 300 to 350 Angstroms. The second solvent system which was utilized comprised a solution containing 90% nitromethane and 10% alcohol, either methanol, ethanol or isopropanol. After casting the membranes on the polysulfone backing material, the excess solvent was removed and the membranes were cured in a humidity chamber at a temperature of 50° C. in a hydrous atmosphere having a relative humidity of 93% for either a period of one hour or a period of 18 hours.

EXAMPLE III

Another membrane was prepared in a manner similar to that set forth in the above example by including along with the isocyanate-capped polymer and the copolymer of at least two saturated or unsaturated heterocyclic nitrogen-containing compounds of Example I a third polymer which comprises poly[methylene poly(phenylisocyanate)]. The three components were dissolved in a similar solvent, that is, nitromethane, or a mixture of nitromethane and an alcohol, and cast on a polysulfone support. Thereafter, the composite membrane was then cured at a temperature of 50° C. in an atmosphere possessing a relative humidity of 93% for a period of either 1 hour or 18 hours.

EXAMPLE IV

The glucose separation abilities of the membranes of the present invention were evaluated by washing a 43 mm diameter disk of the membrane with water, placing the membrane in an ultrafiltration cell and flushing the membrane with water prior to evaluation with the glucose solution. The feedstocks which were employed for these experiments contained 3.0, 6.0, 12.0 amd 30% dissolved solids. The pH of the solution was adjusted to about 4.0 and an ultrafiltration process was initiated. The solution was passed through the membranes at ambient temperature and a pressure of 75 psi.

obtained from treatment of a starch solution with immobilized amyloglucosidase and having the following composition:

| DP1 | DP2 | DP3 | DP4 | DP5 | DP6 | DP7 | DP8 | DP9+ |
|---|---|---|---|---|---|---|---|---|
| 78.2 | 3.4 | 0.5 | 0.1 | 0.1 | 0.3 | 0.2 | 0.4 | 16.8 | are set forth in Table 1 below.

TABLE 1

| MEMBRANE COMPOSITION | | FEED COMPOSITION | IMAG Permeate | | | | | | | | | Flux × $10^4$ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | [(ml/cm$^2$ min)] |
| 0.42 | 0.10 | 3.0 | 1.9 | 0.2 | 0.4 | 0.4 | 0.4 | 0.2 | 0.6 | 3.7 | 92.2 | 20.7 |
| | | 6.0 | 1.2 | 0.1 | 0.2 | 0.2 | 0.4 | 0.4 | 0.7 | 3.7 | 93.1 | 23.0 |
| | | 12.0 | 1.4 | 0.1 | 0.2 | 0.1 | 0.2 | 0.2 | 0.7 | 3.8 | 93.3 | 18.2 |
| 0.42 | 0.20 | 3.0 | 1.4 | 0.3 | 0.2 | 0.1 | 0.4 | 0.5 | 0.8 | 3.8 | 92.5 | 18.9 |
| | | 6.0 | 1.3 | 0.2 | 0.2 | 0.2 | 0.4 | 0.2 | 0.7 | 3.6 | 93.2 | 18.3 |
| | | 12.0 | 0.8 | 0.2 | 0.3 | 0.2 | 0.2 | 0.2 | 0.6 | 3.7 | 93.7 | 11.7 |
| 0.40 | 0.42 | 3.0 | 0.7 | 0.1 | 0.1 | 0.1 | 0.2 | 0.1 | 0.3 | 2.9 | 95.5 | 5.73 |
| | | 6.0 | 0.7 | 0.1 | 0.3 | 0.1 | 0.1 | 0.1 | 0.4 | 2.9 | 95.3 | 3.98 |
| | | 12.0 | 0.4 | 0.1 | 0.1 | 0.1 | 0.1 | 0.2 | 0.4 | 2.9 | 95.7 | 2.01 |
| 0.48 | 0.20 | 3.0 | 0.8 | — | — | — | — | — | 0.3 | 2.7 | 96.2 | 7.37 |
| | | 6.0 | 1.3 | — | — | — | — | — | 0.2 | 2.7 | 95.8 | 4.81 |
| | | 12.0 | 1.2 | — | — | — | — | — | 0.3 | 2.5 | 96.0 | 1.80 |

A—Isocyanate-capped polypropylene glycol (TDI-PPO) (PPO = 425, n̄ = 7.02)
B—Poly[N—vinylimidazole-N—vinylpyrrolidinone]-P(NVI-VP)

EXAMPLE V

In this example interpenetrating polymer network membranes which were prepared by casting a nitromethane solution containing varying amounts of isocyanate-capped poly(propylene glycol) of Example I and a copolymer comprising poly[N-vinylimidazole-N-vinylpyrrolidinone] onto polysulfone possessing pores of 95 Angstrom diameter and curing the resultant membrane for one hour at a temperature of 50° C. and a relative humidity of 93%. The membranes were used in an ultrafiltration cell at conditions similar to that set forth in Example IV above. The results of the tests using a feed

EXAMPLE VI

In this example, a similar membrane was cast upon polysulfone having pore diameters of from 300 to 350 Angstroms, from a nitromethane solution and cured for one hour at a temperature of 50° C. and relative humidity of 93%. The results of these tests are set forth in Table 2 below:

TABLE 2

| MEMBRANE COMPOSITION | | FEED COMPOSITION | IMAG Permeate | | | | | | | | | Flux × $10^4$ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | (ml/min cm$^2$) |
| 0.40 | 0.10 | 3.0 | 13.4 | 0.2 | 0.3 | 0.3 | 0.3 | 0.2 | 0.5 | 3.4 | 81.4 | 1050.0 |
| | | 6.0 | 9.7 | 0.4 | 0.4 | 0.3 | 0.4 | 0.3 | 0.7 | 3.3 | 84.5 | 653.0 |
| | | 12.0 | 6.0 | 0.2 | 0.2 | 0.2 | 0.1 | 0.1 | 0.4 | 3.1 | 89.7 | 438.0 |
| 0.40 | 0.20 | 3.0 | 1.7 | — | — | 0.1 | 0.2 | 0.3 | 0.3 | 2.9 | 94.5 | 103.0 |
| | | 6.0 | 1.5 | 0.1 | 0.3 | 0.4 | 0.3 | 0.2 | 0.4 | 3.6 | 93.2 | 79.6 |
| | | 12.0 | 2.7 | — | — | — | — | — | 0.2 | 2.7 | 94.0 | 55.7 |
| 0.40 | 0.40 | 3.0 | 6.2 | 0.3 | 0.2 | 0.1 | 0.1 | tr | 0.4 | 3.0 | 89.7 | 763.0 |
| | | 6.0 | 4.7 | 0.2 | 0.3 | 0.2 | 0.2 | 0.2 | 1.0 | 3.6 | 89.6 | 294.0 |
| | | 12.0 | 5.2 | — | 0.3 | 0.2 | 0.2 | 0.2 | 0.5 | 3.4 | 90.0 | 231.0 |
| 0.82 | 0.40 | 3.0 | 4.1 | 0.1 | 0.1 | 0.1 | 0.2 | 0.2 | 0.5 | 3.0 | 91.7 | 148.0 |
| | | 6.0 | 3.4 | 0.2 | 0.1 | 0.1 | 0.1 | 0.3 | 0.4 | 2.9 | 92.5 | 117.0 |
| | | 12.0 | 2.2 | — | — | 0.1 | 0.1 | — | 0.1 | 2.4 | 95.1 | 81.2 |

A—Isocyanate-capped polypropylene glycol (TDI-PPO) (PPO = 425, n̄ = 7.02)
B—Poly[N—vinylimidazole-N—vinylpyrrolidinone]-P(NVI-VP)

EXAMPLE VII

In this example the solution containing the two components of the membrane, namely the isocyanate-capped polymer and the copolymer of two heterocyclic nitrogen-containing compounds comprised 90% nitromethane and 10% ethanol. The membranes were cast from this solution onto a polysulfone support possessing pore diameters ranging from 300 to 350 Angstroms. The resulting membranes were cured for a period of one hour at a temperature of 50° C. and a relative humidity of 93%. The results of these tests are set forth in Table 3 .

TABLE 3

| MEMBRANE COMPOSITION | | | FEED COMPOSITION | IMAG Permeate | | | | | | | | | Flux × 10^4 |
|---|---|---|---|---|---|---|---|---|---|---|---|---|---|
| A | B | C | (% DISSOLVED SOLIDS) | DP2+ | DP8 | DP7 | DP6 | DP5 | DP4 | DP3 | DP2 | DP1 | (ml/min cm$^2$) |
| 0.40 | 0.10 | | 3.0 | 1.3 | — | — | — | — | — | 0.1 | 2.8 | 95.8 | 34.2 |
| | | | 6.0 | 0.5 | — | — | — | — | 0.1 | 0.2 | 2.6 | 96.6 | 33.4 |
| | | | 12.0 | 0.6 | — | 0.5 | 0.2 | 0.3 | 0.2 | 0.5 | 3.3 | 94.4 | 21.2 |
| 0.42 | 0.20 | | 3.0 | 5.6 | 0.3 | 0.4 | 0.3 | 0.5 | 0.4 | 1.0 | 3.8 | 87.7 | 185.0 |
| | | | 6.0 | 4.7 | 0.1 | 0.1 | — | — | — | 0.3 | 3.1 | 91.7 | 180.0 |
| | | | 12.0 | 3.0 | 0.1 | 0.1 | 0.1 | 0.1 | 0.1 | 0.5 | 3.5 | 92.5 | 151.0 |
| 0.48 | 0.40 | | 3.0 | 4.4 | 0.1 | — | 0.1 | 0.1 | — | 0.2 | 2.8 | 92.3 | 133.0 |
| | | | 6.0 | 4.6 | 0.2 | — | — | 0.1 | 0.2 | 0.6 | 3.4 | 90.9 | 137.0 |
| | | | 12.0 | 3.3 | 0.1 | 0.1 | 0.1 | 0.1 | 0.1 | 0.3 | 2.8 | 93.1 | 100.0 |
| 0.44 | 0.20 | 0.24 | 3.0 | 0.9 | 0.2 | 0.1 | 0.1 | 0.2 | 0.4 | 0.6 | 3.4 | 94.1 | 45.4 |
| | | | 6.0 | 0.2 | — | — | — | — | — | 0.4 | 3.3 | 96.1 | 26.3 |
| | | | 12.0 | 0.9 | — | 0.2 | 0.2 | 0.2 | 0.2 | 0.3 | 3.1 | 94.9 | 31.0 |

A—Isocyanate-capped polypropylene glycol (TDI-PPO) (PPO = 425, n̄ = 7.02)
B—Poly[N—vinylimidazole-N—vinylpyrrolidinone]-P(NVI-VP)
C—Poly[methylene poly(phenylisocyanate)] (PMDI)

It is to be noted that the fourth membrane in the above table contained 0.24% of poly[methylene poly(phenylisocyanate)] (PMDI).

EXAMPLE VIII

The membranes which were utilized in this sugar separation test were prepared by casting a mixture of isocyanate-capped polypropylene glycol of Example I and poly[N-vinylimidazole-N-vinylpyrrolidinone] from a solution of 100% nitromethane. In addition, the solution also contained varying amounts of poly[methylene poly(phenylisocyanate)]. The mixture was cast on polysulfone which possessed pore diameters ranging from 300 to 350 Angstroms. The resulting membrane was then cured for a period of 18 hours at a temperature of 50° C. in an atmosphere which possessed a relative humidity of 93%. The results of these tests are set forth in Table 4 below:

from a solution comprising 90% nitromethane and 10% ethanol. As in the preceding example, the membranes were cured for a period of 18 hours at 50° C. and a relative humidity of 93%. The results of these tests are set forth in Table 5 below:

TABLE 5

| MEMBRANE COMPOSITION | | | FEED COMPOSITION | IMAG Permeate | | | | | | | | | Flux × 10^4 |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm$^2$) |
| 0.44 | 0.10 | 0.26 | 12.0 | 1.0 | — | — | — | 0.1 | 0.1 | 0.5 | 3.3 | 95.0 | 80.4 |
| | | | 30.0 | 1.2 | — | — | — | 0.1 | 0.1 | 1.0 | 4.0 | 93.6 | 42.2 |
| 0.40 | 0.10 | 0.30 | 6.0 | 0.9 | — | — | — | — | 0.1 | 1.0 | 4.2 | 93.8 | 70.0 |
| | | | 12.0 | 0.8 | — | — | — | — | 0.1 | 0.2 | 3.4 | 95.5 | 61.3 |
| | | | 30.0 | 2.1 | — | — | — | — | 0.2 | 0.7 | 3.8 | 93.2 | 32.6 |
| 0.40 | 0.40 | 0.26 | 12.0 | 1.6 | 0.1 | — | — | — | 0.2 | 0.7 | 4.2 | 93.2 | 35.8 |
| | | | 30.0 | 0.8 | 0.1 | — | — | — | — | 0.2 | 3.1 | 95.8 | 16.7 |

A—Isocyanate-capped polypropylene glycol (TDI-PPO) (PPO = 425, n̄ = 7.02)
B—Poly[N—vinylimidazole-N—vinylpyrrolidinone]-P(NVI-VP)
C—Poly[methylene poly(phenylisocyanate)]

EXAMPLE X

Preparation of TDI-capped polyethylene glycol (TDI-PEO) (PEO,MW=400, n=8.68): Another guest polymer precursor, TDI-capped polyethylene glycol, which comprises the second component of the membrane was prepared by charging 72.0 g (0.413 moles) of toluene diisocyanate (80% 2,4-, 20% 2,6-) into a 500 ml reactor. The reaction mixture was heated to 55° C. with stirring under a nitrogen atmosphere, and 85.0 g (0.213 moles) of poly(ethylene glycol) which had a molecular weight of 400 (n=8.68) was added to the stirred reactor over a period of 1 hour. The reaction mixture was con-

TABLE 4

| MEMBRANE COMPOSITION | | | FEED COMPOSITION | IMAG Permeate | | | | | | | | | Flux × 10^4 |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm$^2$) |
| 0.42 | 0.10 | 0.20 | 12.0 | 1.9 | 0.1 | 0.2 | 0.1 | 0.3 | 0.4 | 0.5 | 3.5 | 93.0 | 57.3 |
| | | | 30.0 | 1.7 | 0.1 | — | — | 0.1 | 0.2 | 0.7 | 3.6 | 93.6 | 38.2 |
| 0.42 | 0.10 | 0.32 | 6.0 | 0.3 | — | — | — | — | — | 0.4 | 3.8 | 95.5 | 163.9 |
| | | | 12.0 | 0.5 | — | — | — | — | — | 0.3 | 3.1 | 96.1 | 123.8 |
| | | | 30.0 | 1.6 | 0.1 | — | — | — | — | 0.5 | 3.8 | 94.0 | 81.2 |

A—Isocyanate-capped polypropylene glycol (TDI-PPO) (PPO = 425, n̄ = 7.02)
B—Poly[N—vinylimidazole-N—vinylpyrrolidinone]-P(NVI-VP)
C—Poly[methylene poly(phenylisocyanate)] (PMDI)

EXAMPLE IX

Sample tests were performed in which the membranes were prepared by casting the mixture of isocyanate-capped polymer of Example I, copolymer of heterocyclic nitrogen-containing compounds and PMDI tinuously stirred while maintaining the temperature of the reactor in a range of from 65° to about 75° C. for a period of three hours. At the end of this time heating was discontinued and after the reactor had returned to room temperature, the isocyanate-capped polymer in an amount of 148.25 g (94.4%) was recovered.

EXAMPLE XI

The composite membrane of the present invention was prepared by casting the TDI-capped poly(ethylene glycol) of Example X and poly(N-vinylimidazole-N-vinylpyrrolidinone) of Example I utilizing a solvent system based on 90% nitromethane and 10% ethanol onto a polysulfone support having a pore diameter of 300–350 Angstroms. After casting the membranes on the polysulfone backing material, the excess solvent was removed and the membranes were cured in a humidity chamber at a temperature of 50° C. in a hydrous atmosphere having a relative humidity of 93% for either a period of 1 hour or a period of 18 hours.

EXAMPLE XII

Another membrane was prepared in a manner similar to that set forth in Example XI by including along with the (TDI-PEO) of Example X and the copolymer P(NVI-VP) of Example I, a third polymer which comprises poly[methylene poly(phenylisocyanate)]. The three components were dissolved in a similar solvent, that is, a mixture of nitromethane and ethanol, and cast on a polysulfone support. Thereafter, the composite membrane was then cured at a temperature of 50° C. in an atmosphere processing a relative humidity of 93% for a period of either 1 hour or 18 hours.

EXAMPLE XIII

The glucose separation abilities of the membranes of the present invention were evaluated in a similar manner as that set forth in Example IV, by washing a 43 mm diameter disk of the membrane with water prior to evaluation with the glucose solution. The feedstocks which were employed for these experiments contained 3.0, 6.0, 12.0 and 30.0% dissolved solids. The pH of the solution was adjusted to about 4.0 and an ultrafiltration process was initiated. The solution was passed through the membranes at ambient temperature and a pressure of 75 pounds per square inch.

EXAMPLE XIV

In this example, interpenetrating polymer network membranes were prepared by casting a solution containing varying amounts of (TDI-PEO) of Example X and P(NVI-VP) of Example I onto polysulfone possessing pores of 300–350 Angstrom diameter and curing the resultant membrane for one hour at a temperature of 50° C. and a relative humidity of 93%. The membranes were used in an ultrafiltration cell at conditions similar to that set forth in Example XIII above. The results of the tests using a feed obtained from treatment of a starch solution with immobilized amyloglucosidase and having the following composition:

| DP1 | DP2 | DP3 | DP4 | DP5 | DP6 | DP7 | DP8 | DP9+ |
|---|---|---|---|---|---|---|---|---|
| 79.3 | 3.3 | 0.8 | 0.3 | 0.2 | 0.2 | 0.3 | 0.3 | 15.3 | are set forth in Table 6.

TABLE 6

| MEMBRANE COMPOSITION | | FEED COMPOSITION | IMAG Permeate | | | | | | | | | Flux × 10$^4$ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | (ml/min cm$^2$) |
| 0.44 | 0.10 | 6.0 | 6.4 | 0.2 | — | — | — | 0.1 | 0.4 | 3.1 | 89.8 | 146.0 |
|  |  | 12.0 | 6.9 | 0.2 | 0.1 | — | — | 0.1 | 0.7 | 3.4 | 88.6 | 141.0 |
|  |  | 30.0 | 5.1 | — | — | — | — | — | 0.3 | 2.9 | 91.7 | 65.0 |
| 0.80 | 0.20 | 6.0 | 0.8 | — | — | — | — | — | 0.2 | 2.5 | 96.5 | 59.7 |
|  |  | 12.0 | 0.8 | — | — | — | — | — | 0.2 | 3.0 | 96.0 | 48.5 |
|  |  | 30.0 | 1.4 | 0.1 | — | — | — | — | 0.4 | 3.1 | 95.0 | 25.5 |
| 0.80 | 0.40 | 6.0 | 0.5 | — | — | — | — | 0.5 | 2.5 | 96.5 | 47.2 |  |
|  |  | 12.0 | 0.3 | — | — | — | — | 0.3 | 0.4 | 2.4 | 96.6 | 39.8 |
|  |  | 30.0 | 0.7 | — | — | — | — | 0.3 | 0.8 | 3.8 | 94.4 | 26.2 |
| 1.20 | 0.40 | 6.0 | 5.5 | 0.2 | 0.3 | 0.4 | 0.4 | 0.2 | 0.8 | 3.7 | 88.5 | 117.0 |
|  |  | 12.0 | 4.6 | 0.3 | 0.3 | 0.2 | 0.2 | 0.2 | 0.8 | 3.8 | 89.6 | 84.7 |
|  |  | 30.0 | 3.2 | 0.3 | 0.3 | 0.3 | 0.2 | 0.5 | 1.0 | 3.6 | 90.6 | 46.4 |
| 1.60 | 0.20 | 6.0 | — | — | — | — | — | 0.1 | 0.4 | 2.0 | 97.5 | 21.5 |
|  |  | 12.0 | — | — | — | — | — | 0.2 | 0.4 | 3.0 | 96.4 | 20.7 |
|  |  | 30.0 | — | — | — | — | 0.1 | 0.3 | 0.6 | 3.2 | 95.8 | 10.9 |
| 1.60 | 0.40 | 6.0 | — | — | — | — | — | 0.1 | 0.3 | 2.2 | 97.5 | 24.7 |
|  |  | 12.0 | — | — | — | — | 0.1 | — | 0.4 | 2.6 | 96.9 | 19.1 |
|  |  | 30.0 | — | — | — | — | — | — | 0.1 | 2.4 | 97.5 | 9.55 |

A—Isocyanate-capped polyethylene glycol (TDI-PEO) (PEO = 400, n = 8.68)
B—Poly[N—vinylimidazole-N—vinylpyrrolidinone] P(NVI-VP)

EXAMPLE XV

In this example the solution containing the two components of the membrane, namely (TDI-PEO) of Example X and P(NVI-VP) of Example I were cast onto a polysulfone support possessing pore diameters ranging from 300–350 Angstroms. The resulting membrane was cured for a period of 18 hours at a temperature of 50° C. in an atmosphere which possessed a relative humidity of 93%. The membranes were tested for sugar separation as set forth in Examples XIII and XIV above. The results of these tests are set forth in Table 7 below:

TABLE 7

| MEMBRANE COMPOSITION | | FEED COMPOSITION | IMAG Permeate | | | | | | | | | Flux × 10$^4$ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | (ml/min cm$^2$) |
| 0.44 | 0.10 | 6.0 | 2.5 | 0.1 | 0.1 | 0.2 | 0.1 | 0.3 | 0.7 | 4.1 | 91.9 | 32.6 |
|  |  | 12.0 | 2.1 | 0.2 | 0.2 | 0.2 | 0.4 | 0.2 | 0.7 | 3.8 | 92.2 | 35.5 |
|  |  | 30.0 | 1.3 | 0.1 | 0.1 | 0.2 | 0.2 | 0.4 | 0.9 | 3.6 | 93.2 | 17.5 |
| 0.80 | 0.20 | 6.0 | 4.1 | 0.2 | — | — | — | — | 0.5 | 3.2 | 92.0 | 180.0 |
|  |  | 12.0 | 3.3 | — | — | — | — | — | 0.2 | 2.5 | 94.0 | 151.0 |

TABLE 7-continued

| MEMBRANE COMPOSITION | | FEED COMPOSITION | IMAG Permeate | | | | | | | | | Flux × 10$^4$ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | (ml/min cm$^2$) |
|  |  | 30.0 | 3.1 | 0.1 | — | — | — | 0.1 | 0.4 | 3.3 | 93.0 | 74.8 |
| 0.80 | 0.40 | 6.0 | 4.6 | — | — | — | — | 0.1 | 0.4 | 3.5 | 91.4 | 398.0 |
|  |  | 12.0 | 4.1 | — | — | — | 0.1 | 0.2 | 0.6 | 3.5 | 91.5 | 279.0 |
|  |  | 30.0 | 5.0 | 0.1 | 0.1 | 0.2 | 0.2 | 0.2 | 0.6 | 3.3 | 91.3 | 123.0 |
| 0.88 | 0.40 | 6.0 | 3.4 | 0.1 | — | — | — | 0.2 | 0.5 | 2.8 | 93.0 | 73.1 |
|  |  | 12.0 | 1.4 | — | — | — | — | — | 0.1 | 2.2 | 96.3 | 58.9 |
|  |  | 30.0 | 1.0 | — | — | — | — | — | 0.2 | 2.5 | 96.3 | 24.8 |
| 1.20 | 0.40 | 6.0 | 1.0 | — | — | — | — | — | — | 2.5 | 96.5 | 15.0 |
|  |  | 12.0 | 0.7 | — | — | — | — | 0.3 | 0.8 | 3.4 | 94.8 | 10.3 |
|  |  | 30.0 | 0.5 | — | — | — | — | — | 0.6 | 3.4 | 95.5 | 5.43 |
| 1.60 | 0.40 | 6.0 | 0.2 | 0.1 | — | 0.1 | — | 0.1 | 0.2 | 2.0 | 97.3 | 8.55 |
|  |  | 12.0 | — | — | — | — | — | 0.2 | 0.3 | 2.0 | 97.5 | 5.28 |
|  |  | 30.0 | — | — | — | — | 0.1 | 0.1 | 0.4 | 2.3 | 97.1 | 1.68 |
| 2.40 | 0.60 | 6.0 | — | — | — | — | — | 0.2 | 0.2 | 1.9 | 97.7 | 24.2 |
|  |  | 12.0 | — | — | — | — | — | — | 0.2 | 2.1 | 97.7 | 10.7 |
|  |  | 30.0 | — | — | — | — | — | — | 0.3 | 2.5 | 97.2 | 3.2 |

A—Isocyanate-capped polyethylene glycol (TDI-PEO) (PEO = 400 $\bar{n}$ = 8.68)
B—Poly[N—vinylimidazole-N—vinylpyrrolidinone] P(NVI-VP)

EXAMPLE XVI

The membranes which were utilized in this sugar separation test were prepared from (TDI-PEO) of Example X and P(NVI-VP) of Example I and varying amounts of poly[methylene poly(phenylisocyanate)]. The membranes were cast as before onto a polysulfone support possessing pore diameters ranging from 300–350 Angstroms. The resulting membrane was cured for one hour at a temperature of 50° C. in an atmosphere which possessed a relative humidity of 93%. The membranes were evaluated as set forth in Examples XIII and XIV above. The results of these tests are set forth in Table 8 below:

EXAMPLE XVII

In this example the solution containing the three components of the membrane, namely (TDI-PEO) of Example X and P(NVI-VP) of Example I and poly[methylene poly(phenylisocyanate)] were cast onto a polysulfone support possessing pore diameters ranging from 300–350 Angstroms. The resulting membrane was cured for 18 hours at a temperature of 50° C. in an atmosphere which possessed a relative humidity of 93%. The membranes were evaluated as set forth in Examples XIII and XIV. The results of these tests are set forth in Table 9 below:

TABLE 8

| MEMBRANE COMPOSITION | | | FEED COMPOSITION | IMAG Permeate | | | | | | | | | Flux × 10$^4$ |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm$^2$) |
| 0.42 | 0.10 | 0.22 | 6.0 | 1.0 | — | — | — | — | 0.1 | 0.2 | 2.9 | 95.8 | 23.9 |
|  |  |  | 12.0 | 1.3 | — | — | — | 0.1 | 0.1 | 0.5 | 3.4 | 94.6 | 20.5 |
|  |  |  | 30.0 | 1.1 | — | — | — | — | 0.1 | 0.2 | 3.1 | 95.5 | 14.2 |
| 0.40 | 0.20 | 0.20 | 6.0 | 0.2 | — | — | — | — | — | 0.6 | 2.2 | 97.0 | 11.8 |
|  |  |  | 12.0 | 0.3 | — | — | — | 0.1 | 0.1 | 0.2 | 2.2 | 97.1 | 9.27 |
|  |  |  | 30.0 | 0.1 | — | — | — | — | — | 0.3 | 2.5 | 97.1 | 5.78 |
| 0.44 | 0.10 | 0.40 | 6.0 | 0.4 | — | — | — | — | — | 0.2 | 1.6 | 97.8 | 7.91 |
|  |  |  | 12.0 | 0.4 | — | — | — | — | 0.3 | 0.4 | 2.4 | 96.5 | 8.11 |
|  |  |  | 30.0 | 0.4 | — | — | — | — | — | 0.4 | 3.0 | 96.2 | 3.82 |
| 0.40 | 0.20 | 0.42 | 6.0 | 0.2 | — | — | — | 0.1 | 0.5 | 0.7 | 3.0 | 95.5 | 6.78 |
|  |  |  | 12.0 | 0.2 | — | — | — | — | 0.2 | 0.3 | 2.1 | 97.4 | 9.46 |
|  |  |  | 30.0 | — | — | — | — | — | — | 0.2 | 2.4 | 97.4 | 2.89 |
| 0.80 | 0.20 | 0.20 | 6.0 | 3.8 | — | — | — | — | — | 0.9 | 2.9 | 92.4 | 97.4 |
|  |  |  | 12.0 | 3.5 | — | — | — | — | 0.1 | 0.5 | 2.8 | 93.1 | 65.1 |
|  |  |  | 30.0 | 1.9 | — | — | — | — | 0.1 | 0.3 | 2.7 | 95.0 | 12.2 |
| 0.84 | 0.40 | 0.46 | 6.0 | — | — | — | — | — | — | 0.2 | 3.0 | 96.8 | 4.76 |
|  |  |  | 12.0 | — | — | — | — | — | — | — | 1.1 | 98.9 | 3.42 |
|  |  |  | 30.0 | — | — | — | — | — | — | — | 2.0 | 98.0 | 1.59 |

A—Isocyanate-capped polyethylene glycol (TDI-PEO) (PEO = 400, $\bar{n}$ = 8.68)
B—Poly[N—vinylimidazole-N—vinylpyrrolidinone] P(NVI-VP)
C—Poly[methylene poly(phenylisocyanate)] PMDI

TABLE 9

| MEMBRANE COMPOSITION | | | FEED COMPOSITION | IMAG Permeate | | | | | | | | | Flux × 10$^4$ |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm$^2$) |
| 0.42 | 0.10 | 0.22 | 6.0 | 1.5 | — | — | — | — | — | 0.4 | 3.2 | 94.9 | 18.9 |
|  |  |  | 12.0 | 1.1 | — | — | — | — | — | 0.3 | 2.8 | 95.7 | 17.1 |
|  |  |  | 30.0 | 1.6 | 0.3 | 0.3 | 0.2 | 0.2 | 0.5 | 0.7 | 3.5 | 92.7 | 9.50 |
| 0.44 | 0.10 | 0.40 | 6.0 | 0.7 | — | — | — | — | — | 0.1 | 1.7 | 97.5 | 7.70 |
|  |  |  | 12.0 | 0.2 | — | — | — | — | — | 0.3 | 3.0 | 96.5 | 6.17 |
|  |  |  | 30.0 | 0.2 | — | — | — | — | 0.2 | 0.6 | 2.8 | 96.2 | 3.52 |
| 0.40 | 0.20 | 0.42 | 6.0 | 0.6 | — | — | — | — | — | 0.2 | 2.0 | 97.2 | 4.51 |

TABLE 9-continued

| MEMBRANE COMPOSITION | | | FEED COMPOSITION | IMAG Permeate | | | | | | | | | Flux × 10⁴ |
| --- | --- | --- | --- | --- | --- | --- | --- | --- | --- | --- | --- | --- | --- |
| A | B | C | (% DISSOLVED SOLIDS) | DP9+ | DP8 | DP7 | DP6 | DP5 | DP4 | DP3 | DP2 | DP1 | (ml/min cm²) |
| | | | 12.0 | 0.3 | — | — | — | — | — | — | 1.3 | 98.4 | 1.67 |
| | | | 30.0 | — | — | — | — | — | — | 0.1 | 2.2 | 97.7 | 0.31 |
| 0.40 | 0.40 | 0.44 | 6.0 | 0.7 | 0.1 | — | — | — | — | 0.2 | 2.6 | 96.4 | 5.11 |
| | | | 12.0 | — | — | — | — | — | 0.1 | 0.7 | 2.7 | 96.5 | 4.38 |
| | | | 30.0 | 0.1 | — | — | — | — | — | 0.3 | 2.6 | 97.0 | 1.74 |
| 0.84 | 0.40 | 0.28 | 6.0 | 0.4 | — | — | — | — | 0.1 | 0.2 | 2.0 | 97.3 | 16.8 |
| | | | 12.0 | 0.8 | — | — | — | — | 0.2 | 0.9 | 3.4 | 94.7 | 18.5 |
| | | | 30.0 | 0.3 | — | — | — | — | — | 0.2 | 2.3 | 97.2 | 3.30 |
| 0.86 | 0.20 | 0.40 | 6.0 | 5.5 | 0.5 | 0.4 | 0.4 | 0.5 | 0.2 | 0.3 | 2.4 | 89.8 | 43.2 |
| | | | 12.0 | 2.7 | — | — | — | — | — | 0.3 | 2.1 | 94.9 | 32.0 |
| | | | 30.0 | 2.8 | — | — | — | — | 0.2 | 0.5 | 2.8 | 93.5 | 14.8 |

A—Isocyanate-capped polyethylene glycol (TDI-PEO) (PEO = 400, n = 8.68)
B—Poly[N—vinylimidazole-N—vinylpyrrolidinone] P(NVI-VP)
C—Poly[methylene poly(phenylisocyanate)] PMDI

EXAMPLE XVIII

Preparation of TDI-capped polyethylene glycol (TDI-PEO) (PEO,MW=300, n=6.4): Another guest polymer precursor, TDI-capped polyethylene glycol, which comprises the second component of the membrane was prepared by charging 70.0 g (0.402 moles) of toluene diisocyanate (80% 2,4-, 20% 2,6-) into a 500 ml reactor. The reaction mixture was heated to 55° C. with stirring under a nitrogen atmosphere, and 66.4 g (0.221 moles) of poly(ethylene glycol) which had a molecular weight of 300 (n=6.4) was added to the stirred reactor over a period of 45 minutes. The reaction mixture was continuously stirred while maintaining the temperature of the reactor in a range of from 75° to about 80° C. for a period of three hours. At the end of this time, heating was discontinued and after the reactor had returned to room temperature, the isocyanate-capped polymer in an amount of 124.4 g (91.4%) was recovered.

EXAMPLE XIX

The composite membrane of the present invention was prepared by casting the two components, TDI-capped polyethylene glycol of Example XVIII and poly(N-vinylimidazole-N-vinylpyrrolidinone) of Example I. In one system, the two components were dissolved in nitromethane and cast from this solution onto a polysulfone having a pore diameter of 300-350 Angstroms. The second solvent system which was utilized comprised a solution containing 90% nitromethane and 10% alcohol, either methanol, ethanol or isopropanol. After casting the membranes on the polysulfone backing material, the excess solvent was removed and the membranes were cured in a humidity chamber at a temperature of 50° C. in a hydrous atmosphere having a relative humidity of 93% for either a period of 1 hour or a period of 18 hours.

EXAMPLE XX

Another membrane was prepared in a manner similar to that set forth in the above example by including along with the (TDI-PEO) of Example XVIII and the copolymer P(NVI-VP) of Example I, a third polymer which comprises poly[methylene poly(phenylisocyanate)]. The three components were dissolved in a similar solvent, that is, nitromethane, or a mixture of nitromethane and an alcohol, and cast on a polysulfone support. Thereafter, the composite membrane was then cured at a temperature of 50° C. in an atmosphere possessing a relative humidity of 93% for a period of either one hour or 18 hours.

EXAMPLE XXI

The glucose separation abilities of the membranes of the present invention were evaluated in a similar manner as that set forth in Examples IV and XIII, by washing a 43 mm diameter disk of the membrane with water prior to evaluation with the glucose solution. The feedstocks which were employed for these experiments contained 6.0, 12.0 and 30.0% dissolved solids. The pH of the solution was adjusted to about 4.0 and an ultrafiltration process was initiated. The solution was passed through the membranes at ambient temperature (20°-25° C.) or supra ambient temperature (25°-60.5° C.) and a pressure of 75 pounds per square inch.

EXAMPLE XXII

In this example, interpenetrating polymer network membranes were prepared by casting a solution containing varying amounts of (TDI-PEO) of Example XVIII and P(NVI-VP) of Example I in nitromethane onto polysulfone possessing pores of 300-350 Angstrom diameter and curing the resultant membrane for 1 hour at a temperature of 50° C. and a relative humidity of 93%. The membranes were used in an ultrafiltration cell at conditions similar to that set forth in Examples XIII and XIV above. The results of the tests using a feed obtained from treatment of a starch solution with immobilized amyloglucosidase and having the following composition:

| DP1 | DP2 | DP3 | DP4 | DP5 | DP6 | DP7 | DP8 | DP9+ |
| --- | --- | --- | --- | --- | --- | --- | --- | --- |
| 79.5 | 3.3 | 0.6 | 0.2 | 0.2 | 0.3 | 0.3 | 0.3 | 15.3 | as set forth in Table 10 below:

TABLE 10

| MEMBRANE COMPOSITION | | FEED COMPOSITION | IMAG Permeate | | | | | | | | | Flux × 10⁴ |
| --- | --- | --- | --- | --- | --- | --- | --- | --- | --- | --- | --- | --- |
| A | B | (% DISSOLVED SOLIDS) | DP9+ | DP8 | DP7 | DP6 | DP5 | DP4 | DP3 | DP2 | DP1 | (ml/min cm²) |
| 0.48 | 0.10 | 6.0 | 1.2 | 0.1 | 0.1 | 0.2 | 0.2 | 0.4 | 0.7 | 3.7 | 93.4 | 78.3 |
| | | 12.0 | 1.3 | 0.2 | 0.2 | 0.3 | 0.3 | 0.2 | 0.7 | 3.7 | 94.1 | 122.0 |
| | | 30.0 | 1.7 | 0.3 | 0.3 | 0.2 | 0.2 | 0.3 | 0.9 | 3.7 | 92.4 | 104.0 |

TABLE 10-continued

| MEMBRANE COMPOSITION | | FEED COMPOSITION | IMAG Permeate | | | | | | | | | Flux × 10⁴ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | (ml/min cm²) |
| 0.42 | 0.20 | 6.0 | 1.4 | — | 0.2 | 0.2 | 0.3 | 0.3 | 0.6 | 3.8 | 93.2 | 100.0 |
| | | 12.0 | 1.4 | — | 0.4 | 0.3 | 0.3 | 0.2 | 0.9 | 3.7 | 92.8 | 102.0 |
| | | 30.0 | 1.1 | 0.1 | 0.1 | 0.1 | 0.2 | 0.2 | 0.7 | 3.9 | 93.6 | 68.9 |
| 0.44 | 0.40 | 6.0 | 0.4 | — | 0.1 | 0.2 | 0.3 | 0.3 | 0.7 | 3.7 | 94.3 | 102.0 |
| | | 12.0 | 0.2 | 0.1 | 0.2 | 0.2 | 0.3 | 0.3 | 0.6 | 4.0 | 94.1 | 107.0 |
| | | 30.0 | 0.2 | 0.1 | 0.1 | 0.3 | 0.3 | 0.4 | 0.9 | 3.7 | 94.0 | 66.5 |

A—Isocyanate-capped polyethylene glycol (TDE-PEO) (PEO = 300, n̄ = 6.4)
B—Poly[N—vinylimidazole-N—vinylpyrrolidinone] P(NVI-VP)

EXAMPLE XXIII

In this example the solution containing the two components of the membrane, namely (TDI-PEO) of Example XVIII and P(NVI-VP) of Example I, comprised 90% nitromethane and 10% ethanol. The membranes were cast from this solution onto a polysulfone support possessing pore diameters ranging from 300–350 Angstroms. The resulting membrane was cured for a period of 1 hour at a temperature of 50° C. in an atmosphere which possessed a relative humidity of 93%. The membranes were tested for sugar separation as set forth in Examples XIII and XXII above. The results of these tests are set forth in Table 11 below:

TABLE 11

| MEMBRANE COMPOSITION | | FEED COMPOSITION | IMAG Permeate | | | | | | | | | Flux × 10⁴ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | (ml/min cm²) |
| 0.30 | 0.20 | 6.0 | 3.2 | — | — | — | — | — | 0.1 | 2.7 | 94.0 | 8.75 |
| | | 12.0 | 1.9 | — | — | — | — | — | 0.3 | 2.7 | 95.1 | 6.37 |
| | | 30.0 | 1.3 | — | — | — | 0.1 | 0.3 | 3.2 | 95.8 | | 2.79 |
| 0.28 | 0.40 | 6.0 | 10.4 | 0.4 | 0.2 | 0.2 | 0.2 | 0.2 | 0.2 | 2.8 | 85.4 | 442.0 |
| | | 12.0 | 8.5 | 0.2 | 0.2 | 0.2 | 0.2 | 0.3 | 0.6 | 3.1 | 86.7 | 284.0 |
| | | 30.0 | 4.1 | 0.3 | 0.2 | 0.2 | 0.1 | 0.3 | 0.8 | 3.7 | 90.4 | 113.0 |
| 0.46 | 0.10 | 6.0 | 6.7 | 0.3 | 0.2 | 0.2 | 0.2 | 0.4 | 0.6 | 3.8 | 87.6 | 122.6 |
| | | 12.0 | 4.4 | 0.7 | 0.4 | 0.1 | 0.3 | 0.5 | 0.9 | 3.9 | 88.8 | 116.2 |
| | | 30.0 | 5.0 | 0.4 | 0.2 | 0.3 | 0.2 | 0.4 | 0.9 | 4.0 | 88.6 | 64.5 |
| 0.46 | 0.40 | 6.0 | 0.5 | — | — | — | — | — | 0.1 | 2.6 | 96.8 | 49.3 |
| | | 12.0 | 0.7 | 0.1 | — | — | — | 0.2 | 0.6 | 3.6 | 94.8 | 37.4 |
| | | 30.0 | 1.0 | — | — | — | — | — | 0.4 | 3.4 | 95.2 | 19.1 |

A—Isocyanate-capped polyethylene glycol (TPI-PEO) (PEO = 300, n̄ = 6.4)
B—Poly[N—vinylimidazole-N—vinylpyrrolidinone] P(NVI-VP)

EXAMPLE XXIV

In this example the nitromethane solution containing various amounts of (TDI-PEO) of Example XVIII and P(NVI-VP) of Example I, were cast onto a polysulfone support possessing pore diameters ranging from 300–350 Angstroms. The resulting membrane was cured for a period of 18 hours at a temperature of 50° C. in an atmosphere which possessed a relative humidity of 93%. The membranes were tested for sugar separation as set forth in Examples XIII and XXII above. The results of these tests are set forth in Table 12 below:

TABLE 12

| MEMBRANE COMPOSITION | | FEED COMPOSITION | IMAG Permeate | | | | | | | | | Flux × 10⁴ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | (ml/min cm²) |
| 0.48 | 0.10 | 6.0 | 2.9 | 0.1 | — | — | 0.1 | — | 0.2 | 2.8 | 93.9 | 157.0 |
| | | 12.0 | 3.3 | — | — | — | — | 0.2 | 0.4 | 3.7 | 92.4 | 219.0 |
| | | 30.0 | 2.2 | 0.1 | — | — | — | 0.2 | 0.6 | 3.6 | 93.3 | 128.0 |
| 0.42 | 0.20 | 6.0 | 3.8 | 0.2 | 0.2 | 0.2 | 0.2 | 0.2 | 0.7 | 3.7 | 90.8 | 159.0 |
| | | 12.0 | 4.5 | 0.1 | 0.1 | 0.2 | 0.3 | 0.3 | 0.9 | 3.7 | 89.9 | 232.0 |
| | | 30.0 | 2.9 | 0.3 | 0.2 | 0.2 | 0.3 | 0.4 | 0.8 | 3.6 | 91.3 | 114.0 |
| 0.44 | 0.40 | 6.0 | — | — | 0.1 | 0.1 | 0.3 | 0.2 | 0.6 | 3.6 | 95.1 | 133.0 |
| | | 12.0 | 0.5 | 0.1 | 0.1 | 0.1 | 0.1 | 0.3 | 0.9 | 3.9 | 94.0 | 158.0 |
| | | 30.0 | 0.5 | — | — | 0.2 | 0.3 | 0.2 | 0.7 | 3.7 | 94.4 | 84.7 |

A—Isocyanate-capped polyethylene glycol (TDI-PEO) (PEO = 300, n̄ = 6.4)
B—Poly[N—vinylimidazole-N—vinylpyrrolidinone] P(NVI-VP)

EXAMPLE XXV

In this example the membranes were cast from a solution of 90% nitromethane and 10% ethanol which contained varying amounts of (TDI-PEO) of Example XVIII and P(NVI-VP) of Example I onto a polysulfone support possessing pore diameters ranging from 300–350 Angstroms. The resulting membrane was cured for a period of 18 hours at a temperature of 50° C. in an atmosphere which possessed a relative humidity of 93%. The membranes were tested for sugar separations as set forth in Examples XIII and XXII above. The results of these tests are set forth in Table 13 below:

TABLE 13

| MEMBRANE COMPOSITION | | FEED COMPOSITION | IMAG Permeate | | | | | | | | | Flux × 10⁴ |
|---|---|---|---|---|---|---|---|---|---|---|---|---|
| A | B | (% DISSOLVED SOLIDS) | DP9+ | DP8 | DP7 | DP6 | DP5 | DP4 | DP3 | DP2 | DP1 | (ml/min cm²) |
| 0.30 | 0.10 | 6.0 | 2.7 | — | — | — | — | 0.1 | 0.3 | 3.3 | 93.6 | 43.4 |
| | | 12.0 | 1.6 | 0.1 | 0.2 | 0.1 | 0.2 | 0.2 | 0.6 | 3.2 | 93.8 | 44.2 |
| | | 30.0 | 1.3 | 0.2 | 0.2 | 0.1 | 0.2 | 0.3 | 0.6 | 3.7 | 93.4 | 22.6 |
| 0.28 | 0.40 | 6.0 | 0.4 | — | — | 0.1 | — | 0.1 | 0.8 | 3.1 | 95.5 | 43.6 |
| | | 12.0 | 0.2 | 0.1 | 0.2 | 0.2 | 0.3 | 0.3 | 0.5 | 3.7 | 94.5 | 19.0 |
| | | 30.0 | 0.1 | — | — | — | — | 0.1 | 0.3 | 2.8 | 96.7 | 6.10 |
| 0.46 | 0.10 | 6.0 | 7.0 | 0.5 | 0.3 | 0.4 | 0.3 | 0.6 | 1.0 | 3.4 | 86.5 | 134.5 |
| | | 12.0 | 5.8 | 0.3 | 0.2 | 0.3 | 0.3 | 0.7 | 1.0 | 3.8 | 87.6 | 144.8 |
| | | 30.0 | 4.7 | 0.4 | 0.1 | 0.2 | 0.1 | 0.1 | 0.4 | 3.5 | 90.5 | 76.4 |
| 0.46 | 0.20 | 6.0 | 0.6 | — | — | — | — | — | 0.2 | 2.7 | 96.5 | 25.5 |
| | | 12.0 | 0.9 | — | — | — | — | 0.2 | 0.2 | 3.6 | 95.1 | 21.5 |
| | | 30.0 | 0.4 | — | — | — | — | — | 0.1 | 2.4 | 97.1 | 9.60 |
| 0.46 | 0.40 | 6.0 | 0.7 | — | — | — | — | — | 0.2 | 3.1 | 96.0 | 23.1 |
| | | 12.0 | 0.4 | — | — | — | — | — | — | 2.8 | 96.8 | 20.7 |
| | | 30.0 | 0.7 | — | — | — | — | — | 0.4 | 3.5 | 95.4 | 10.3 |

A—Isocyanate-capped polyethylene glycol (TDI-PEO) (PEO = 300, n̄ = 6.4)
B—Poly[N—vinylimidazole-N—vinylpyrrolidinone] P(NVI-VP)

EXAMPLE XXVI

The membranes which were utilized in this sugar separation test were prepared from (TDI-PEO) of Example XVIII and P(NVI-VP) of Example I and varying amounts of poly[methylene poly(phenylisocyanate)] dissolved in nitromethane. The membranes were cast as before onto a polysulfone support possessing pore diameters ranging from 300–350 Angstroms. The resulting membrane was cured for 1 hour at a temperature of 50° C. in an atmosphere which possessed a relative humidity of 93%. The membranes were evaluated as set forth in Examples XIII and XXII above. The results of these tests are set forth in Table 14 below:

EXAMPLE XXVII

The membranes which were employed in this sugar separation test were prepared from (TDI-PEO) of Example XVIII and P(NVI-VP) of Example I and varying amounts of poly[methylene poly(phenylisocyanate)] dissolved in a solution of 90% nitromethane and 10% ethanol. The membranes were cast as before onto a polysulfone support and cured for one hour at a temperature of 50° C. in an atmosphere which possessed a relative humidity of 93%. The membranes were evaluated as set forth in Examples XIII and XXII above. The results of these tests are set forth in Table 15 below:

TABLE 14

| MEMBRANE COMPOSITION | | | FEED COMPOSITION | IMAG Permeate | | | | | | | | | Flux × 10⁴ |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm²) |
| 0.30 | 0.10 | 0.20 | 6.0 | 1.9 | — | — | — | 0.3 | 0.5 | 1.1 | 3.7 | 92.5 | 290.0 |
| | | | 12.0 | 2.2 | — | — | — | — | 0.2 | 0.8 | 4.2 | 92.6 | 175.0 |
| | | | 30.0 | 0.9 | — | — | — | 0.1 | 0.1 | 0.3 | 4.2 | 95.4 | 105.0 |
| 0.30 | 0.30 | 0.20 | 6.0 | 13.1 | 0.4 | 0.4 | 0.7 | 0.8 | 0.4 | 0.8 | 3.5 | 79.9 | 895.0 |
| | | | 12.0 | 9.3 | 0.2 | — | — | 0.4 | 0.2 | 0.5 | 3.8 | 85.6 | 448.0 |
| | | | 30.0 | 6.7 | 0.1 | 0.5 | 0.2 | 0.5 | 0.5 | 1.1 | 3.5 | 86.9 | 116.0 |
| 0.46 | 0.20 | 0.20 | 6.0 | 0.7 | — | — | — | — | — | 0.4 | 3.6 | 95.9 | 32.6 |
| | | | 12.0 | 0.8 | — | — | — | — | 0.1 | 0.4 | 2.8 | 95.9 | 27.9 |
| | | | 30.0 | 0.5 | — | — | — | — | 0.1 | 0.2 | 2.7 | 96.5 | 11.9 |
| 0.46 | 0.40 | 0.20 | 6.0 | 0.1 | — | — | — | — | — | 0.1 | 3.0 | 96.8 | 59.0 |
| | | | 12.0 | 0.1 | — | — | — | — | — | 0.5 | 3.2 | 96.2 | 64.5 |
| | | | 30.0 | — | — | — | — | — | — | 0.6 | 3.0 | 96.4 | 40.6 |
| 0.84 | 0.10 | 0.28 | 6.0 | 0.8 | 0.1 | 0.1 | 0.2 | 0.2 | 0.2 | 0.6 | 3.8 | 94.0 | 5.40 |
| | | | 12.0 | 0.7 | 0.1 | 0.2 | 0.2 | 0.2 | 0.2 | 0.7 | 4.2 | 93.5 | 6.70 |
| | | | 30.0 | 0.8 | 0.1 | 0.2 | 0.2 | 0.2 | 0.2 | 0.7 | 4.1 | 93.5 | 3.20 |
| 1.60 | 0.40 | 0.84 | 6.0 | 1.7 | 0.3 | 0.3 | 0.1 | 0.4 | 0.5 | 0.7 | 4.0 | 92.0 | 347.0 |
| | | | 12.0 | 1.2 | 0.1 | 0.1 | 0.1 | 0.2 | 0.3 | 0.8 | 3.8 | 93.4 | 286.0 |
| | | | 30.0 | 1.8 | 0.2 | 0.1 | 0.1 | 0.2 | 0.2 | 0.8 | 3.9 | 92.7 | 128.0 |

A—Isocyanate-capped polyethylene glycol (TDI-PEO) (PEO = 300, n̄ = 6.4)
B—Poly[N—vinylimidazole-N—vinylpyrrolidinone] P(NVI-VP)
C—Poly[methylene poly(phenylisocyanate)] PMDI

TABLE 15

| MEMBRANE COMPOSITION | | | FEED COMPOSITION | IMAG Permeate | | | | | | | | | Flux × 10⁴ |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm²) |
| 0.30 | 0.10 | 0.20 | 6.0 | 15.5 | 0.2 | 0.2 | 0.2 | 0.2 | 0.3 | 0.8 | 3.8 | 78.8 | 15600.0 |
| | | | 12.0 | 15.3 | 0.2 | 0.3 | 0.3 | 0.3 | 0.2 | 0.7 | 3.6 | 79.1 | 9710.0 |
| | | | 30.0 | 16.0 | 0.3 | 0.4 | 0.3 | 0.3 | 0.2 | 0.7 | 3.5 | 78.3 | 3340.0 |
| 0.40 | 0.20 | 0.22 | 6.0 | 1.1 | — | — | — | — | — | 0.3 | 2.5 | 96.1 | 73.0 |
| | | | 12.0 | 1.5 | — | — | — | 0.1 | 0.1 | 0.1 | 2.2 | 96.0 | 70.0 |
| | | | 30.0 | 0.6 | 0.1 | 0.1 | 0.1 | 0.1 | 0.1 | 0.2 | 2.1 | 96.5 | 40.9 |
| 0.46 | 0.40 | 0.46 | 6.0 | 0.5 | 0.1 | 0.1 | — | 0.1 | — | 0.5 | 3.2 | 95.5 | 135.0 |
| | | | 12.0 | 0.3 | — | — | 0.1 | — | 0.1 | 0.2 | 2.8 | 96.5 | 97.0 |

TABLE 15-continued

| MEMBRANE COMPOSITION | | | FEED COMPOSITION | IMAG Permeate | | | | | | | | | Flux × 10⁴ |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm²) |
| | | | 30.0 | 0.3 | — | — | — | 0.1 | 0.2 | 0.6 | 3.5 | 95.3 | 42.5 |
| 0.80 | 0.40 | 0.26 | 6.0 | 1.2 | — | — | — | — | 0.2 | 0.7 | 3.2 | 94.7 | 66.8 |
| | | | 12.0 | 0.4 | — | — | — | 0.1 | 0.7 | 3.5 | 95.3 | | 45.4 |
| | | | 30.0 | 0.4 | — | — | — | 0.1 | 0.4 | 3.4 | 95.7 | | 15.9 |
| 1.02 | 0.20 | 0.10 | 6.0 | 12.6 | 0.4 | 0.5 | 0.4 | 0.5 | 0.5 | 1.0 | 4.1 | 80.0 | 3820.0 |
| | | | 12.0 | 12.8 | 0.3 | 0.4 | 0.3 | 0.3 | 0.2 | 0.6 | 3.7 | 81.4 | 2230.0 |
| | | | 30.0 | 12.7 | 0.2 | 0.4 | 0.3 | 0.4 | 0.3 | 0.7 | 3.7 | 81.3 | 462.0 |
| 1.00 | 0.40 | 0.10 | 6.0 | 0.6 | — | 0.2 | 0.2 | 0.2 | 0.2 | 0.6 | 3.7 | 94.3 | 561.0 |
| | | | 12.0 | 1.2 | 0.1 | 0.1 | 0.1 | 0.2 | 0.3 | 0.7 | 3.7 | 93.6 | 374.0 |
| | | | 30.0 | 0.2 | — | 0.1 | — | — | — | 0.2 | 3.0 | 96.5 | 153.0 |

A—Isocyanate-capped polyethylene glycol (TDI-PEO) (PEO = 300, $\bar{n}$ = 6.4)
B—Poly[N—vinylimidazole-N—vinylpyrrolidinone] P(NVI-VP)
C—Poly[methylene poly(phenylisocyanate)] PMDI

EXAMPLE XXVIII

In this example the nitromethane solution containing the three components of the membrane, namely (TDI-PEO) of Example XVIII and P(NVI-VP) of Example I and poly[methylene poly(phenylisocyanate)] were cast onto a polysulfone support. The resulting membrane was cured for a period of 18 hours at a temperature of 50° C. in an atmosphere which possessed a relative humidity of 93%. The membranes were evaluated for sugar separation as set forth in Examples XIII and XXII above. The results of these tests are set forth in Table 16 below:

EXAMPLE XXIX

In this example the membranes were prepared from various ratios of (TDI-PEO) of Example XVIII, P(NVI-VP) of Example I and PMDI in a solution of 90% nitromethane and 10% ethanol. The membranes were cast as before onto a polysulfone support and cured for 18 hours at a temperature of 50° C. in an atmosphere which possessed a relative humidity of 93%. The membranes were evaluated for sugar separation as set forth in Examples XIII and XXII above. The results of these tests are set forth in Table 17 below:

TABLE 16

| MEMBRANE COMPOSITION | | | FEED COMPOSITION | IMAG Permeate | | | | | | | | | Flux × 10⁴ |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm²) |
| 0.30 | 0.20 | 0.20 | 6.0 | — | — | — | — | 0.1 | 0.1 | 0.2 | 3.1 | 96.5 | 24.9 |
| | | | 12.0 | 0.7 | 0.2 | — | 0.1 | — | — | 0.9 | 3.3 | 94.8 | 19.1 |
| | | | 30.0 | — | 0.1 | — | 0.2 | — | — | 0.3 | 2.8 | 96.6 | 8.40 |
| 0.30 | 0.30 | 0.20 | 6.0 | 6.3 | — | 0.1 | 0.1 | 0.1 | 0.1 | 0.6 | 3.7 | 89.0 | 407.0 |
| | | | 12.0 | 2.2 | 0.1 | 0.2 | 0.1 | 0.2 | 0.2 | 0.8 | 3.6 | 92.6 | 244.0 |
| | | | 30.0 | 2.3 | — | 0.4 | 0.4 | 0.5 | 0.5 | 0.7 | 3.9 | 91.3 | 107.0 |
| 0.42 | 0.20 | 0.44 | 6.0 | — | — | — | — | 0.1 | 0.2 | 0.5 | 3.6 | 95.7 | 318.0 |
| | | | 12.0 | — | — | 0.1 | 0.2 | 0.7 | 1.3 | 2.4 | 4.6 | 90.7 | 252.0 |
| | | | 30.0 | — | — | — | 0.2 | 0.3 | 0.2 | 0.4 | 3.9 | 95.0 | 93.1 |
| 1.04 | 0.20 | 0.16 | 6.0 | 0.5 | — | — | — | — | — | 0.3 | 2.5 | 96.7 | 199.0 |
| | | | 12.0 | 1.0 | 0.1 | 0.1 | 0.1 | 0.1 | 0.1 | 0.2 | 2.5 | 95.8 | 140.0 |
| | | | 30.0 | — | — | — | — | — | — | 0.2 | 3.0 | 96.8 | 63.2 |
| 1.60 | 0.10 | 0.40 | 6.0 | 8.1 | 0.3 | 0.2 | 0.3 | 0.3 | 0.4 | 0.5 | 3.4 | 86.5 | 544.0 |
| | | | 12.0 | 4.7 | 0.2 | 0.2 | 0.2 | 0.3 | 0.2 | 0.6 | 3.4 | 90.2 | 362.0 |
| | | | 30.0 | 4.4 | 0.1 | 0.2 | 0.2 | 0.2 | 0.2 | 0.5 | 3.5 | 90.7 | 131.0 |
| 1.60 | 0.40 | 0.84 | 6.0 | — | — | — | — | 0.1 | 0.3 | 3.0 | 96.6 | | 228.0 |
| | | | 12.0 | 0.3 | — | — | — | — | 0.1 | 0.7 | 3.9 | 95.0 | 183.0 |
| | | | 30.0 | 0.4 | — | — | — | 0.1 | 0.2 | 0.7 | 3.7 | 94.9 | 74.8 |

A—Isocyanate-capped polyethylene glycol (TDI-PEO) (PEO = 300, $\bar{n}$ = 6.4)
B—Poly[N—vinylimidazole-N—vinylpyrrolidinone] P(NVI-VP)
C—Poly[methylene poly(phenylisocyanate)] PMDI

TABLE 17

| MEMBRANE COMPOSITION | | | FEED COMPOSITION | IMAG Permeate | | | | | | | | | Flux × 10⁴ |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm²) |
| 0.30 | 0.30 | 0.20 | 6.0 | 1.1 | — | — | — | — | 0.1 | 0.4 | 2.6 | 95.8 | 30.7 |
| | | | 12.0 | 0.5 | — | — | — | — | 0.1 | 0.5 | 3.5 | 95.4 | 14.4 |
| | | | 30.0 | 1.4 | — | 0.5 | 0.7 | 0.1 | 0.3 | 0.5 | 3.5 | 93.0 | 7.20 |
| 0.46 | 0.20 | 0.40 | 6.0 | 1.7 | 0.2 | 0.2 | 0.1 | 0.1 | 0.2 | 0.7 | 3.4 | 93.4 | 66.7 |
| | | | 12.0 | 1.1 | 0.2 | 0.1 | 0.1 | 0.2 | 0.2 | 0.4 | 3.0 | 94.7 | 58.3 |
| | | | 30.0 | 0.6 | 0.1 | 0.1 | 0.1 | 0.1 | 0.2 | 0.2 | 2.8 | 95.8 | 26.2 |
| 0.46 | 0.40 | 0.46 | 6.0 | — | — | — | — | 0.1 | 0.3 | 0.8 | 3.0 | 95.8 | 61.3 |
| | | | 12.0 | — | — | — | — | — | — | 0.2 | 2.5 | 97.3 | 46.4 |
| | | | 30.0 | — | — | — | — | — | — | 0.3 | 3.1 | 96.6 | 18.8 |
| 0.60 | 0.40 | 0.14 | 6.0 | 1.4 | 0.2 | 0.2 | 0.1 | 0.3 | 0.4 | 0.7 | 3.0 | 93.7 | 92.8 |
| | | | 12.0 | 0.3 | — | — | — | — | 0.1 | 0.7 | 3.5 | 95.4 | 74.6 |
| | | | 30.0 | 0.1 | — | — | 0.1 | 0.1 | — | 0.2 | 2.8 | 96.7 | 22.2 |
| 0.80 | 0.20 | 0.26 | 6.0 | 6.2 | 0.2 | 0.2 | 0.2 | 0.2 | 0.3 | 0.8 | 3.9 | 87.8 | 123.0 |
| | | | 12.0 | 5.9 | 0.1 | 0.1 | 0.1 | 0.1 | 0.3 | 0.5 | 3.4 | 89.5 | 94.7 |

TABLE 17-continued

| MEMBRANE COMPOSITION | | | FEED COMPOSITION | IMAG Permeate | | | | | | | | | Flux × 10⁴ |
|---|---|---|---|---|---|---|---|---|---|---|---|---|---|
| A | B | C | (% DISSOLVED SOLIDS) | DP9+ | DP8 | DP7 | DP6 | DP5 | DP4 | DP3 | DP2 | DP1 | (ml/min cm²) |
| | | | 30.0 | 5.0 | 0.3 | 0.3 | 0.3 | 0.4 | 0.3 | 0.8 | 4.0 | 88.6 | 37.4 |
| 1.00 | 0.40 | 0.10 | 6.0 | 0.3 | 0.1 | 0.1 | 0.1 | 0.1 | — | 0.3 | 2.9 | 96.1 | 128.0 |
| | | | 12.0 | — | — | — | — | — | 0.2 | 0.3 | 3.1 | 96.4 | 91.8 |
| | | | 30.0 | — | — | — | — | 0.2 | 0.2 | 0.6 | 3.7 | 95.3 | 35.5 |

A—Isocyanate-capped polyethylene glycol (TDI-PEO) (PEO = 300, n̄ = 6.4)
B—Poly[N—vinylimidzaole-N—vinylpyrrolidinone] P(NVI-VP)
C—Poly[methylene poly(phenylisocyanate)] PMDI

EXAMPLE XXX

In this example the membrane composed of 0.46% (TDI-PEO) of Example XVIII, 0.40% P(NVI-VP) of Example I and 0.46% PMDI was cast from a solution of 90% nitromethane and 10% ethanol onto a polysulfone support. The membrane was cured at a temperature of 50° C. in an atmosphere which possessed a relative humidity of 93% for a period of 18 hours. The membrane was evaluated over a temperature range of 25°–60.5° C. with 30% dissolved solids solution as set forth in Example XXII. The results of these tests are set forth in Table 18 below:

TABLE 18

| TEMP (°C.) | IMAG Permeate | | | | | | | | | Flux × 10⁴ |
|---|---|---|---|---|---|---|---|---|---|---|
| | DP9+ | DP8 | DP7 | DP6 | DP5 | DP4 | DP3 | DP2 | DP1 | [(ml/cm² min)] |
| 25 | 1.0 | — | — | — | 0.2 | 0.2 | 0.6 | 3.1 | 94.9 | 14.8 |
| 41.0 | 0.3 | — | — | — | — | — | 0.2 | 2.8 | 96.7 | 20.7 |
| 60.5 | 1.3 | — | — | — | 0.3 | 0.4 | 0.7 | 3.3 | 94.0 | 32.4 |

It is to be noted from the above examples interpenetrating polymer network membranes may be prepared from polyurethanes generated from isocyanate-capped polyethers with or without the presence of an additional component such as poly[methylene poly(phenylisocyanate)] and copolymers containing at least two saturated or unsaturated heterocyclic nitrogen-containing compounds in which the components of the membrane are present in varying ratios. When utilizing a three-component membrane such as (TDI-PPO):P(NVI-VP):PMDI, the components may be present in a range of from about 4:1:2 to 1.3:1.1:1, with the best being those with a ratio of 2:2:1 to 2:2:1.5, while when utilizing a binary IPN system the preferred ratio of isocyanate-capped polymer to copolymer ranges from about 3:1 to about 2:1. Systems utilizing an isocyanate-capped polyethylene glycol (TDI-PEO) with a chain length of n=8.68 showed that the ternary systems of (TDI-PEO):P(NVI-VP): PMDI may be present in a range of 2:1:1.15 to 8.8:1.0:4.4, while the binary system preferred the ratio of (TDI-PEO): P(NVI-VP) in a range of 2:1 to 4:1. Systems utilizing an isocyanate-capped polyethylene glycol (TDI-PEO) with a PEO chain length of n=6.4 showed that ternary systems of (TDI-PEO): P(NVI-VP): PMDI may be present in a range of 10:2:1 to 2.3:1:2, while the binary system preferred the ratio of (TDI-PEO): P(NVI-VP) in a range of 3:1 to 1:1.45.

We claim as our invention:

1. A composite membrane which comprises an interpenetrating polymer network of:
   (1) an isocyanate-capped polyether which is obtained by reacting a polyether with a diisocyanate, said isocyanate-capped polyether being physically entwined with
   (2) a copolymer of at least two saturated or unsaturated heterocyclic nitrogen-containing compounds, said composite membrane being supported on a porous backing support material; and
   (3) said component (1) being physically entwined with compound (2) by means of a generated polyurethane, said polyurethane being formed by the curing of said membrane at a temperature in the range of from about ambient to about 100° C. in an atmosphere which possesses a relative humidity in the range of from about 20% to about 100% for a period of time sufficient to generate an amine-capped polymer by the hydrolysis of a portion of said isocyanate-capped polyether, with said amine-capped polymer subsequently reacitng with a portion of the isocyanate groups present in said membrane to form a polyurethane which serves to physically entwine said component (2) in said membrane.

2. The composite membrane as set forth in claim 1 in which said polyether is selected from the group consisting of polyethylene glycol, polypropylene glycol and block copolymers of ethylene glycol and propylene glycol, having an average molecular weight of 100 to 450.

3. The composite membrane as set forth in claim 1 in which said diisocyanate is selected from the group consisting of toluene diisocyanate, methylene diphenyldiisocyanate, ethylene diphenylisocyanate, and propylene diphenylisocyante.

4. The composite membrane as set forth in claim 1 in which said isocyanate-capped polymer and said copolymer of at least two saturated or unsaturated heterocyclic nitrogen-containing compounds are present in a weight ratio in the range of from about 1:1 to about 8:1 weight percent of isocyanate-capped polymer to copolymer of at least two saturated or unsaturated heterocyclic nitrogen-containing compounds.

5. The composite membrane as set forth in claim 1 in which said isocyanate-capped polymer is the reaction product obtained by reacting toluene diisocyanate with polypropylene glycol and said copolymer of at least two saturated or unsaturated heterocyclic nitrogen-containing compounds is poly[N-vinylpyridine-N-vinylpyrrolidinone].

6. The composite membrane as set forth in claim 1 in which said isocyanate-capped polymer is the reaction product obtained by reacting toluene diisocyanate with polyethylene glycol and said copolymer of at least two saturated or unsaturated heterocyclic nitrogen-containing compounds is poly [N-vinylimidazole-N-vinylpyrrolidinone].

7. The composite membrane as set forth in claim 1 in which said isocyanate-capped polymer is the reaction product obtained by reacting toluene diisocyanate with polyethylene glycol and said copolymer of at least two saturated or unsaturated heterocyclic nitrogen-containing compounds is poly[N-vinylimidazole-N-vinylpyrrolidinone].

8. The composite membrane as set forth in claim 1 in which said isocyanate-capped polymer is the reaction product obtained by reacting toluene diisocyanate with polyethylene glycol and said copolymer of at least two saturated or unsaturated heterocyclic nitrogen-containing compounds is poly[N-vinylimidazole-N-vinylpiperidine].

9. The composite membrane as set forth in claim 1 in which said porous support backing material is polysulfone.

10. The composite membrane as set forth in claim 1 in which said porous support backing material is polyethylene.

11. A process for the production of a composite interpenetrating polymer network membrane which comprises reacting a polyether with a diisocyanate to form an isocyanate-capped polyether, admixing said isocyanate-capped polyether with a copolymer of at least two saturated or unsaturated heterocyclic nitrogen-containing compounds, casting said membrane on a porous backing support material, curing the resultant composite at a temperature in the range of from about ambient to about 100° C. in an atmosphere which possesses a relative humidity in the range of from about 20% to about 100% for a period of time sufficient to generate an amine-capped polymer by the hydrolysis of a portion of said isocyanate-capped polyether, with said amine-capped polymer subsequently reacting with a portion of the isocyanate groups present in said membrane to form a polyurethane which serves to physically entwine said component (2) in said membrane, and recovering the resultant composite interpenetrating network membrane.

12. The process as set forth in claim 11 in which said polyether is selected from the group consisting of polyethylene glycol, polypropylene glycol and block copolymers of ethylene glycol and propylene glycol having an average molecular weight in the range of from about 100 to about 450.

13. The process as set forth in claim 11 in which said diisocyanate is selected from the group consisting of toluene diisocyanate, methylene diphenylisocyanate, ethylene diphenylisocyanate, and propylene diphenylisocyanate.

14. The process as set forth in claim 11 in which the isocyanate-capped polymer of the interpenetrating polymer network membrane is the reaction product obtained by reacting toluene diisocyanate with a block copolymer of ethylene glycol and propylene glycol, said copolymer of at least two saturated or unsaturated heterocyclic nitrogen-containing compounds is poly[N-vinylpyridine-N-vinylpyrrolidinone] and said porous support backing material is polysulfone.

15. The process as set forth in claim 11 in which said isocyanate-capped polymer of the interpenetrating polymer network membrane is the reaction product obtained by reacting toluene diisocyanate with polypropylene glycol, said copolymer of at least two saturated or unsaturated heterocyclic nitrogen-containing compounds is poly[N-vinylimidazole-N-vinylpyrrolidinone] and said porous support backing material is polysulfone.

16. The process as set forth in claim 11 in which said isocyanate-capped polymer of the interpenetrating polymer network membrane is the reaction product obtained by reacting toluene diisocyanate with polyethylene glycol, and said copolymer of at least two saturated or unsaturated heterocyclic nitrogen-containing compounds is poly[N-vinylimidazole-N-vinylpyrrolidinone] and said porous support backing material is polyethylene.

17. The process as set forth in claim 11 in which said isocyanate-capped polymer of the interpenetrating polymer network membrane is the reaction product obtained by reacting toluene diisocyanate with polyethylene glycol, said copolymer of at least two saturated or unsaturated heterocyclic nitrogen-containing compounds is poly[N-vinylimidazole-N-vinylpyrrolidinone] and said porous support backing material is polysulfone.

18. The process as set forth in claim 11 in which said isocyanate-capped polymer of the interpenetrating polymer network membrane is the reaction product obtained by reacting toluene diisocyanate with polyethylene glycol, said copolymer of at least two saturated or unsaturated heterocyclic nitrogen-containing compounds is poly[N-vinylimidazole-N-vinylpiperidine] and said porous support backing material is polysulfone.

19. A process for the separation of a saccharide from a mixture of mono- and polysaccharides which comprises passing said mixture across a composite membrane comprising an interpenetrating polymer network at separation conditions to form a retentate and a permeate, and recovering said permeate consisting mainly of a monosaccharide, said interpenetrating polymer network being comprised of:

() an isocyanate-capped polymer which is obtained by reacting a polyether with a diisocyanate, said isocyanate-capped polyether being physically entwined with (2) a copolymer of at least two saturated or unsaturated heterocyclic nitrogen-containing compounds, said composite membrane being supported on a porous backing support material; and (3) said component (1) being physically entwined with component (2) by means of a generated polyurethane, said polyurethane being formed by the curing of said membrane at a temperature in the range of from about ambient to about 100° C. in an atmosphere which possesses a relative humidity in the range of from about 20% to about 100% for a period of time sufficient to generate an amine-capped polymer by the hydrolysis of a portion of said isocyanate-capped polyether, with said amine-capped polymer subsequently reacting with a portion of the isocyanate groups present in said membrane to form a polyurethane which serves to physically entwine said component (2) in said membrane.

20. The process as set forth in claim 19 in which said separation conditions include a temperature in the range of from about ambient to about 70° C. and a pressure in the range of from about 25 to about 1500 pounds per square inch.

21. The process as set forth in claim 19 in which said composite membrane comprises an interpenetrating polymer network in which the isocyanate-capped polymer is the reaction product obtained by reacting toluene diisocyanate with a block copolymer of ethylene glycol and propylene glycol, said copolymer of at least two saturated or unsaturated heterocyclic nitrogen-containing compounds is poly[N-vinylpyridine-N-vinylpyrrolidinone] and said porous support backing material is polysulfone.

22. The process as set forth in claim 19 in which said composite membrane comprises an interpenetrating polymer network in which the isocyanate-capped polymer is the reaction product obtained by reacting toluene diisocyanate with polypropylene glycol, said copolymer of at least two saturated or unsaturated heterocyclic nitrogen-containing compounds is poly[N-vinylimidazole-N-vinylpyrrolidinone] and said porous support backing material is polysulfone.

23. The process as set forth in claim 19 in which said composite membrane comprises an interpenetrating polymer network in which the isocyanate-capped polymer is the reaction product obtained by reacting toluene diisocyanate with polyethylene glycol and said copolymer of at least two saturated or unsaturated heterocyclic nitrogen-containing compounds is poly[N-vinylimidazole-N-vinylpyrrolidinone] and said porous support backing material is polyethylene.

24. The process as set forth in claim 19 in which said composite membrane comprises an interpenetrating polymer network in which the isocyanate-capped polymer is the reaction product obtained by reacting toluene diisocyanate with polyethylene glycol and said copolymer of at least two saturated or unsaturated heterocyclic nitrogen-containing compounds is poly[N-vinylimidazole-N-vinylpiperidine] and said porous support backing material is polysulfone.

25. The process as set forth in claim 19 in which said composite membrane comprises an interpenetrating polymer network in which the isocyanate-capped polymer is the reaction product obtained by reacting toluene diisocyanate with polyethylene glycol, said copolymer of at least two saturated or unsaturated heterocyclic nitrogen-containing compounds is poly[N-vinylimidazole-N-vinylpyrrolidinone] and said porous support backing material is polysulfone.

26. The process as set forth in claim 19 in which said composite membrane comprises an interpenetrating polymer network in which the isocyanate-capped polymer is the reaction product obtained by reacting toluene diisocyanate with polyethylene glycol, said copolymer of at least two saturated or unsaturated heterocyclic nitrogen-containing compounds is poly[N-vinylimidazole-N-vinylpiperdine] and said porous support backing material is polysulfone.

27. The process as set forth in claim 19 in which said monosaccharide comprises glucose.

* * * * *

UNITED STATES PATENT AND TRADEMARK OFFICE
CERTIFICATE OF CORRECTION

PATENT NO. : 4,747,953
DATED : May 31, 1988
INVENTOR(S) : Zupancic et al.

It is certified that error appears in the above-identified patent and that said Letters Patent is hereby corrected as shown below:

In Column 32, line 16: Change "compound" to --component--.

Signed and Sealed this

First Day of November, 1988

Attest:

DONALD J. QUIGG

*Attesting Officer*     *Commissioner of Patents and Trademarks*